United States Patent
Song

(10) Patent No.: US 12,469,577 B2
(45) Date of Patent: Nov. 11, 2025

(54) SEMICONDUCTOR SYSTEM RELATED TO PERFORMING AN ERROR CHECK SCRUB OPERATION

(71) Applicant: SK hynix Inc., Icheon-si (KR)

(72) Inventor: Choung Ki Song, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 120 days.

(21) Appl. No.: 18/441,264

(22) Filed: Feb. 14, 2024

(65) Prior Publication Data

US 2025/0125000 A1    Apr. 17, 2025

(30) Foreign Application Priority Data

Oct. 17, 2023   (KR) .................. 10-2023-0139065

(51) Int. Cl.
| | | |
|---|---|---|
| *G11C 11/00* | (2006.01) | |
| *G11C 8/06* | (2006.01) | |
| *G11C 8/18* | (2006.01) | |
| *G11C 29/52* | (2006.01) | |

(52) U.S. Cl.
CPC ............... *G11C 29/52* (2013.01); *G11C 8/06* (2013.01); *G11C 8/18* (2013.01)

(58) Field of Classification Search
CPC .............. G11C 29/52; G11C 8/06; G11C 8/18
See application file for complete search history.

(56) References Cited

U.S. PATENT DOCUMENTS

| | | | |
|---|---|---|---|
| 10,037,244 B2 * | 7/2018 | Chung ............... | G11C 29/52 |
| 2008/0148108 A1 | 6/2008 | Barnum et al. | |
| 2023/0153194 A1* | 5/2023 | Song ................ | G11C 8/06 |
| | | | 714/807 |
| 2023/0185473 A1 | 6/2023 | Choi et al. | |
| 2025/0068508 A1* | 2/2025 | Sun ................. | G11C 29/44 |

FOREIGN PATENT DOCUMENTS

KR    1020020090794 A    12/2002

* cited by examiner

*Primary Examiner* — Pho M Luu
(74) *Attorney, Agent, or Firm* — WILLIAM PARK AND ASSOCIATES LTD.

(57) ABSTRACT

A semiconductor system includes a controller outputting a chip selection signal and a command address for performing a read operation and then outputting the chip selection signal and the command address for performing an ECS operation, and a semiconductor device including a plurality of memory cells and generating a latch row address and a latch column address by latching the command address when an error occurs in internal data that are output from a memory cell that is selected, among a plurality of memory cells, after the start of the read operation based on the chip selection signal and the command address, determining the priority of the ECS operation for the plurality of memory cells based on the latch row address and the latch column address, and storing the internal data in the same memory cell again by correcting the error of the internal data.

23 Claims, 16 Drawing Sheets

SEMICONDUCTOR SYSTEM RELATED TO PERFORMING AN ERROR CHECK SCRUB OPERATION

CROSS-REFERENCE TO RELATED APPLICATION

The present application claims priority under 35 U.S.C. § 119 (a) to Korean Patent Application No. 10-2023-0139065, filed in the Korean Intellectual Property Office on Oct. 17, 2023, the entire disclosure of which is incorporated herein by reference.

BACKGROUND

1. Technical Field

The present disclosure generally relates to a semiconductor system and more particularly to a semiconductor system, which latches a command address when an error occurs in internal data after the start of a read operation, preferentially performs an error check scrub (ECS) operation on a memory cell corresponding to the latched command address after the start of an ECS operation, and then sequentially performs the ECS operation on a plurality of memory cells.

2. Related Art

Recently, in order to increase the operating speed of a semiconductor device, methods of inputting and outputting multi-bit data every clock cycle, such as DDR2, DDR3, DDR4, and DDR5, are used. A separate device and method for guaranteeing the reliability of data transmission is additionally required because the probability that an error occurring in a process of data being transmitted will occur is increased when the input/output speed of data becomes fast.

A method of guaranteeing the reliability of data transmission by generating an error check code capable of checking whether an error occurs whenever data are transmitted and transmitting the error check code along with the data is used. The error check code includes an error detection code (EDC) capable of detecting an error occurred and an error correction code (ECC) capable of autonomously correcting an error when the error occurs.

Furthermore, a semiconductor device prevents an error of internal data by performing an error check scrub (ECS) operation of correcting an error of internal data stored in the semiconductor device by using an ECC and storing the internal data again. The ECS operation is an operation of correcting an error of internal data stored therein and storing the internal data again by sequentially activating all memory cells that have been included in the semiconductor device.

SUMMARY

In an embodiment, a semiconductor system may include a controller configured to output a chip selection signal and a command address including a first logic level combination for performing a read operation and configured to then output a chip selection signal and a command address including a second logic level combination different from the first logic level combination for performing an error check scrub (ECS) operation, and a semiconductor device comprising a plurality of memory cells and configured to receive the command address to generate an internal command address used to generate a latch row address and a latch column address by latching the internal command address when an error occurs in internal data that is output from a memory cell that is selected, from the plurality of memory cells, after a start of the read operation based on the chip selection signal and the command address, configured to determine a priority of the ECS operation for the plurality of memory cells corresponding to the latch row address and the latch column address, and configured to store the internal data in the same memory cell again that was selected after correcting the error of the internal data.

In an embodiment, a semiconductor device may include an operation control circuit configured to receive a command address to generate an internal command address used to generate a latch row address and a latch column address by latching the command address for selecting a memory cell that is included in a memory circuit when an error flag signal is enabled after the start of a read operation and configured to generate a row address and a column address from the latch row address and the latch column address by detecting a logic level of the error flag signal after the start of an error check scrub (ECS) operation or configured to generate the row address and the column address that are sequentially counted, and an ECS control circuit configured to correct an error included in internal data that is output from the memory cell that is selected by the row address and the column address after the start of the ECS operation and configured to output the internal data having the error corrected before storing the internal data in the memory cell again.

In an embodiment, an error check scrub (ECS) method may include a read operation step of generating a latch row address and a latch column address by latching an internal command address, generated from a command address, when an error occurs in internal data that has been stored in a memory cell that is selected by a row address and a column address that is generated based on the command address, among a plurality of memory cells, after the start of a read operation and outputting the internal data as data after correcting the error of the internal data, and an ECS operation step of storing the internal data that has been stored in the memory cell that is selected again based on the latch row address and the latch column address after correcting the error of the internal data based on a logic level of the error flag signal after the start of an ECS operation and then storing the internal data that has been stored in the plurality of memory cells again after correcting an error of the internal data.

DETAILED DESCRIPTION

Figure 1:
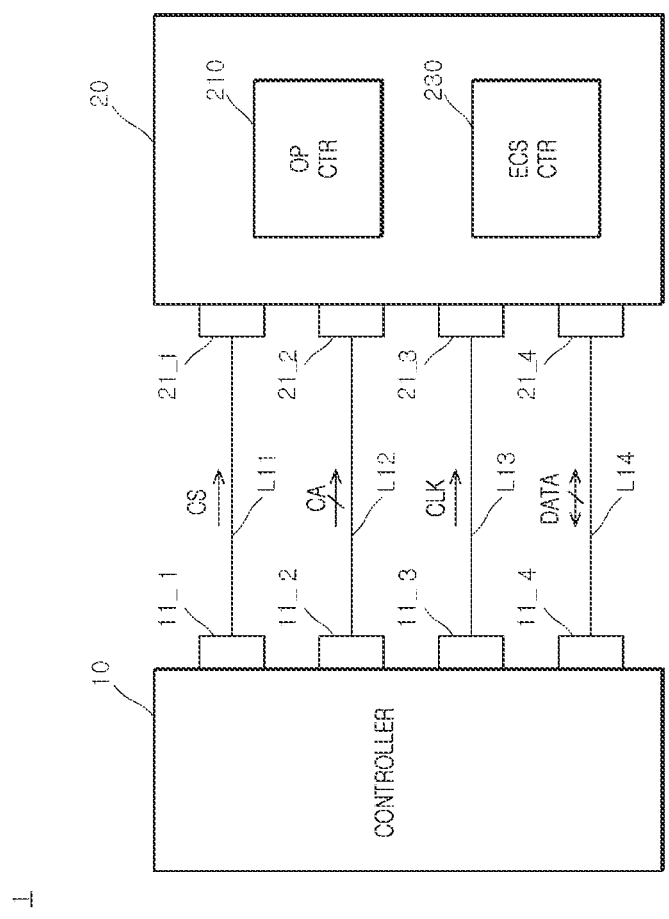
FIG. 1 is a block diagram illustrating a construction of a semiconductor system according to an embodiment of the present disclosure.

In the descriptions of the following embodiments, the term "preset" indicates that the numerical value of a parameter is previously decided, when the parameter is used in a process or algorithm. According to an embodiment, the numerical value of the parameter may be set when the process or algorithm is started or while the process or algorithm is performed.

Terms such as "first" and "second," which are used to distinguish among various components, are not limited by the components. For example, a first component may be referred to as a second component, and vice versa.

When one component is referred to as being "coupled" or "connected" to another component, it should be understood that the components may be directly coupled or connected to each other or coupled or connected to each other through another component interposed therebetween. In contrast, when one component is referred to as being "directly coupled" or "directly connected" to another component, it should be understood that the components are directly coupled or connected to each other without another component interposed therebetween.

A "logic high level" and a "logic low level" are used to describe the logic levels of signals. A signal having a "logic high level" is distinguished from a signal having a "logic low level." For example, when a signal having a first voltage corresponds to a signal having a "logic high level," a signal having a second voltage may correspond to a signal having a "logic low level." According to an embodiment, a "logic high level" may be set to a voltage higher than a "logic low level." According to an embodiment, the logic levels of signals may be set to different logic levels or opposite logic levels. For example, a signal having a logic high level may be set to have a logic low level in some embodiments, and a signal having a logic low level may be set to have a logic high level in some embodiments.

Hereafter, the present disclosure will be described in more detail through embodiments. The embodiments are only used to exemplify the present disclosure, and the scope of the present disclosure is not limited by the embodiments.

Embodiments of the present disclosure provide a semiconductor system, which latches a command address when an error occurs in internal data after the start of a read operation, preferentially performs an error check scrub (ECS) operation on a memory cell corresponding to the latched command address after the start of an ECS operation, and then sequentially performs the ECS operation on a plurality of memory cells.

According to an embodiment of the present disclosure, it is possible to set the priority of an ECS operation by latching a command address when an error occurs in internal data after the start of a read operation, preferentially performing an ECS operation on a memory cell corresponding to the latched command address after the start of an ECS operation, and then sequentially performing the ECS operation on a plurality of memory cells. In an embodiment, the semiconductor device 20 may determine a priority of the ECS operation for the plurality of memory cells MC based on a latch row address RLA<1:M> and a latch column address CLA<1:N>.

Furthermore, according to an embodiment of the present disclosure, it is possible to rapidly correct an error of internal data by latching a command address when an error occurs in the internal data after the start of a read operation, preferentially performing an ECS operation on a memory cell corresponding to the latched command address after the start of an ECS operation, and then sequentially performing the ECS operation on a plurality of memory cells.

As illustrated in FIG. 1, a semiconductor system 1 according to an embodiment of the present disclosure may include a controller 10 and a semiconductor device 20. The semiconductor device 20 may include an operation control circuit (OP CTR) 210 and an error check scrub (ECS) control circuit (ECS CTR) 230.

The controller 10 may include a first control pin 11_1, a second control pin 11_2, a third control pin 11_3, and a fourth control pin 11_4. The semiconductor device 20 may include a first device pin 21_1, a second device pin 21_2, a third device pin 21_3, and a fourth device pin 21_4. A first transmission line L11 may be connected between the first control pin 11_1 and the first device pin 21_1. A second transmission line L12 may be connected between the second control pin 11_2 and the second device pin 21_2. A third transmission line L13 may be connected between the third control pin 11_3 and the third device pin 21_3. A fourth transmission line L14 may be connected between the fourth control pin 11_4 and the fourth device pin 21_4.

The controller 10 may transmit a chip selection signal CS for controlling the semiconductor device 20 to the semiconductor device 20 through the first transmission line L11. The controller 10 may transmit a command address CA for controlling the semiconductor device 20 to the semiconductor device 20 through the second transmission line L12. The controller 10 may transmit a clock CLK to the semiconductor device 20 through the third transmission line L13. The controller 10 may transmit data DATA to the semiconductor device 20 through the fourth transmission line L14. The controller 10 may receive data DATA from the semiconductor device 20 through the fourth transmission line L14. The chip selection signal CS may be set as a signal that is enabled in order to perform a normal operation, ECS operation, and internal operation of the semiconductor device 20. The command address CA may include a plurality of bits, and may be set as a signal that includes a command for controlling an operation of the semiconductor device 20 and an address for selecting a plurality of memory cells (MC in FIG. 8) and a plurality of error cells (EC in FIG. 8). The clock CLK may be set as a signal that is periodically toggled in order to synchronize operations of the controller 10 and the semiconductor device 20. The data DATA may include a plurality of bits, and may be set as common data that are input to and output from the semiconductor device 20.

The operation control circuit 210 may latch the command address CA for selecting a memory cell when an error occurs in internal data (ID<1:128> in FIG. 2) that are output from the plurality of memory cells (MC in FIG. 8) that are included in a memory circuit (220 in FIG. 2) after the start of a read operation of a normal operation. The operation control circuit 210 may generate latch row addresses (RLA<1:M> in FIG. 4) and latch column addresses (CLA<1:N> in FIG. 4) based on the command address CA that is latched. The operation control circuit 210 may generate row addresses (RAD<1:M> in FIG. 2) and column addresses (CAD<1:N> in FIG. 2) from the latch row addresses (RLA<1:M> in FIG. 4) and the latch column addresses (CLA<1:N> in FIG. 4), respectively, and then generate the row addresses (RAD<1:M> in FIG. 2) and the column addresses (CAD<1:N> in FIG. 2) that are sequentially counted, after the start of an ECS operation.

The ECS control circuit 230 may correct an error of the internal data (ID<1:128> in FIG. 2) that are output from the memory cell (MC in FIG. 8) that is selected by the row addresses (RAD<1:M> in FIG. 2) and the column addresses (CAD<1:N> in FIG. 2) after the start of an ECS operation, and may output the internal data (ID<1:128> in FIG. 2) having the error corrected in order to store the internal data in the memory cell (MC in FIG. 8) again.

The semiconductor device 20 may generate the latch row addresses (RLA<1:M> in FIG. 4) and the latch column addresses (CLA<1:N> in FIG. 4) by latching the command address CA when an error occurs in the internal data (ID<1:128> in FIG. 2) that are output from the memory cell (MC in FIG. 8) that is selected, among the plurality of memory cells, after the start of a read operation of a normal operation based on the chip selection signal CS and the command address CA. The semiconductor device 20 may determine the priority of an ECS operation for the plurality of memory cells based on the latch row addresses (RLA<1:M> in FIG. 4) and the latch column addresses (CLA<1:N> in FIG. 4), may correct an error of the internal data (ID<1:128> in FIG. 2), and may store the internal data in the same memory cell again. The semiconductor device 20 may correct an error of the internal data (ID<1:128> in FIG. 2) that are output from the memory cell (MC in FIG. 8) that is selected by the row addresses (RAD<1:M> in FIG. 2) and the column addresses (CAD<1:N> in FIG. 2), among the plurality of memory cells, after the start of the read operation of the normal operation based on the chip selection signal CS and the command address CA, and may output the internal data having the error corrected as the data DATA. The semiconductor device 20 may store the internal data (ID<1:128> in FIG. 2) that are generated from the data DATA, in the memory cell (MC in FIG. 8) that is selected by the row addresses (RAD<1:M> in FIG. 2) and the column addresses (CAD<1:N> in FIG. 2), among the plurality of memory cells, after the start of a write operation of the normal operation based on the chip selection signal CS and the command address CA.

Figure 2:
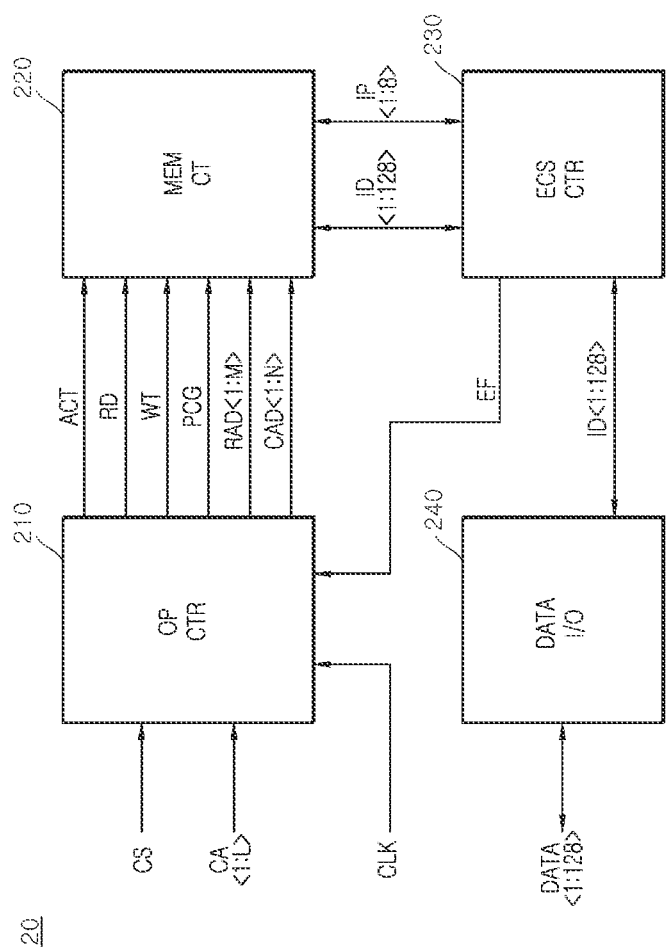
FIG. 2 is a block diagram illustrating a construction according to an embodiment of a semiconductor device that is included in the semiconductor system illustrated in FIG. 1.

FIG. 2 is a block diagram illustrating a construction according to an embodiment of the semiconductor device 20 that is included in the semiconductor system 1. The semiconductor device 20 may include an operation control circuit (OP CTR) 210, the memory circuit (MEM CT) 220, an ECS control circuit (ECS CTR) 230, and a data input and output circuit (DATA I/O) 240.

The operation control circuit 210 may generate an active command ACT, a read command RD, a write command WT, and a precharge command PCG, based on the chip selection signal CS and first to fourth command addresses CA<1:4> in synchronization with the clock CLK. The operation control circuit 210 may generate the active command ACT that is enabled when the chip selection signal CS and the first to fourth command addresses CA<1:4> each have a logic level combination for an active operation in synchronization with the clock CLK. The operation control circuit 210 may generate the read command RD that is enabled when the chip selection signal CS and the first to fourth command addresses CA<1:4> each have a logic level combination for a read operation of a normal operation and a read operation of an ECS operation in synchronization with the clock CLK. The operation control circuit 210 may generate the write command WT that is enabled when the chip selection signal CS and the first to fourth command addresses CA<1:4> each have a logic level combination for a write operation of a normal operation and a write operation of an ECS operation in synchronization with the clock CLK. The operation control circuit 210 may generate the precharge command PCG that is enabled when the chip selection signal CS and the first to fourth command addresses CA<1:4> each have a logic level combination for a precharge operation in synchronization with the clock CLK. The first to fourth command addresses CA<1:4> may be set as a first group of the command addresses. In an embodiment, the first to Nth command addresses CAD<1:N> may include the first group of the command address including first to fourth command addresses CA<1:4>.

An active operation may be set as an operation of activating a plurality of word lines that are included in the memory circuit 220 before a read operation and a write operation are performed. A read operation of a normal operation may be set as an operation for outputting the first to 128-th internal data ID<1:128> and first to eighth internal parities IP<1:8> that have been stored in the memory circuit 220. A write operation of a normal operation may be set as an operation for storing the first to 128-th internal data ID<1:128> and the first to eighth internal parities IP<1:8> in the memory circuit 220. A read operation of an ECS operation may be set as an operation for outputting the first to 128-th internal data ID<1:128> and the first to eighth internal parities IP<1:8> that have been stored in the memory circuit 220. A write operation of an ECS operation may be set as an operation for storing the first to 128-th internal data ID<1:128> having an error corrected in the same memory cell of the memory circuit 220 from which the first to 128-th internal data ID<1:128> have been output after the start of a read operation of the ECS operation, based on the first to 128-th internal data ID<1:128> and the first to eighth internal parities IP<1:8>. A read operation of an ECS operation and a write operation of the ECS operation may be consecutively performed. A precharge operation may be set as a common precharge operation.

The operation control circuit 210 may generate the first to M-th row addresses RAD<1:M> and the first to N-th column addresses CAD<1:N>, based on fifth to L-th command addresses CA<5:L> after the start of a read operation and write operation of a normal operation. The operation control circuit 210 may latch the fifth to L-th command addresses CA<5:L> when an error flag signal EF is enabled to a logic high level after the start of a read operation of a normal operation. The operation control circuit 210 may generate the first to M-th row addresses RAD<1:M> and the first to N-th column addresses CAD<1:N>, based on the fifth to L-th command addresses CA<5:L> depending on the logic level of the error flag signal EF after the start of an ECS operation. The operation control circuit 210 may generate the first to M-th row addresses RAD<1:M> and the first to N-th column addresses CAD<1:N>, based on the fifth to L-th command addresses CA<5:L> that have been latched during an interval in which the error flag signal EF is enabled to a logic high level after the start of an ECS operation. The operation control circuit 210 may generate the first to M-th row addresses RAD<1:M> and the first to N-th column addresses CAD<1:N> that are sequentially counted during an interval in which the error flag signal EF is disabled to a logic low level after the start of an ECS operation. The fifth to L-th command addresses CA<5:L> may be set as a second group of the command addresses.

Figure 8:
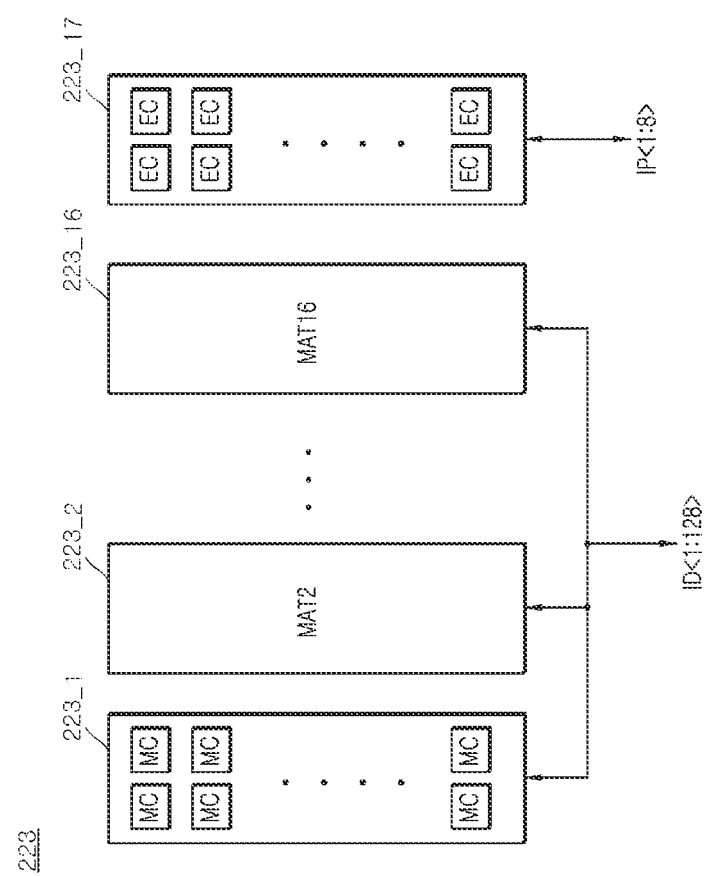
FIG. 8 is a block diagram illustrating a construction according to an embodiment of a core circuit that is included in the memory circuit illustrated in FIG. 7.

The memory circuit 220 may include first to sixteenth mats (223_1 to 223_16 in FIG. 8) and an error storage region (223_17 in FIG. 8). The first to sixteenth mats (223_1 to 223_16 in FIG. 8) may each include a plurality of word lines (WL<1> to WL<M> in FIG. 9) and a plurality of column lines (Yi<1> to Yi<N> in FIG. 9), and may include the plurality of memory cells (MC in FIG. 8) that are connected to the plurality of word lines (WL<1> to WL<M> in FIG. 9) and the plurality of column lines (Yi<1> to Yi<N> in FIG. 9).

The memory circuit 220 may perform an active operation for activating the plurality of word lines (WL<1> to WL<M> in FIG. 9) based on the first to M-th row addresses RAD<1:M> when the active command ACT is enabled. The memory circuit 220 may output the first to 128-th internal data ID<1:128> and the first to eighth internal parities IP<1:8> that have been stored in a memory cell that is selected by the first to M-th row addresses RAD<1:M> and the first to N-th column addresses CAD<1:N>, among the plurality of memory cells (MC in FIG. 8), when the read command RD is enabled after the start of a read operation of a normal operation. The memory circuit 220 may store the first to 128-th internal data ID<1:128> in a memory cell that is selected by the first to M-th row addresses RAD<1:M> and the first to N-th column addresses CAD<1:N>, among the plurality of memory cells (MC in FIG. 8), when the write command WT is enabled after the start of a write operation of a normal operation. The memory circuit 220 may output the first to 128-th internal data ID<1:128> and the first to eighth internal parities IP<1:8> that have been stored in a memory cell that is selected by the first to M-th row addresses RAD<1:M> and the first to N-th column addresses CAD<1:N>, among the plurality of memory cells (MC in FIG. 8), when the read command RD is enabled after the start of a read operation of an ECS operation. The memory circuit 220 may store the first to 128-th internal data ID<1:128> having an error corrected in a memory cell that is selected by the first to M-th row addresses RAD<1:M> and the first to N-th column addresses CAD<1:N>, among the plurality of memory cells (MC in FIG. 9), when the write command WT is enabled after the start of a write operation of an ECS operation. The memory circuit 220 may perform a precharge operation when the precharge command PCG is enabled.

The ECS control circuit 230 may correct an error of the first to 128-th internal data ID<1:128> based on the first to 128-th internal data ID<1:128> and the first to eighth internal parities IP<1:8> after the start of a read operation of a normal operation. The ECS control circuit 230 may output the first to 128-th internal data ID<1:128> having an error corrected to the data input and output circuit 240 after the start of a read operation of a normal operation. The ECS control circuit 230 may output, to the memory circuit 220, the first to 128-th internal data ID<1:128> that are generated from the first to 128-th data DATA<1:128> after the start of a write operation of a normal operation. The ECS control circuit 230 may output, to the memory circuit 220, the first to eighth internal parities IP<1:8> that are generated by performing an ECC encoding operation on the first to 128-th internal data ID<1:128> that are generated from the first to 128-th data DATA<1:128> after the start of a write operation of a normal operation. The ECS control circuit 230 may correct an error of the first to 128-th internal data ID<1:128> based on the first to 128-th internal data ID<1:128> and the first to eighth internal parities IP<1:8> after the start of a read operation of an ECS operation. The ECS control circuit 230 may output the first to 128-th internal data ID<1:128> having an error corrected to the memory circuit 220 in order to store the first to 128-th internal data ID<1:128> having the error corrected in the memory cell (MC in FIG. 8) again after the start of a write operation of an ECS operation.

The ECS control circuit 230 may generate the error flag signal EF that is enabled to a logic high level when an error occurs in the first to 128-th internal data ID<1:128> after the start of a read operation of a normal operation. The ECS control circuit 230 may correct an error of the first to 128-th internal data ID<1:128>, store the first to 128-th internal data ID<1:128> having the error corrected in the memory circuit 220 again, and generate the error flag signal EF that is disabled to a logic low level, after the start of a write operation of an ECS operation.

The data input and output circuit 240 may output the first to 128-th internal data ID<1:128> having an error corrected as the first to 128-th data DATA<1:128> after the start of a read operation of a normal operation. The data input and output circuit 240 may output the first to 128-th data DATA<1:128> as the first to 128-th internal data ID<1:128> after the start of a write operation of a normal operation.

The semiconductor device 20 may generate the first to M-th row addresses RAD<1:M> and the first to N-th column addresses CAD<1:N> by latching the fifth to L-th command addresses CA<5:L> when an error occurs in the first to 128-th internal data ID<1:128> that are output from the memory cell (MC in FIG. 8) that is selected, among the plurality of memory cells, after the start of a read operation of a normal operation based on the chip selection signal CS and the first to L-th command addresses CA<1:L>. The semiconductor device 20 may determine the priority of an ECS operation for the plurality of memory cells based on the first to M-th row addresses RAD<1:M> and the first to N-th column addresses CAD<1:N>, may correct an error of the first to 128-th internal data ID<1:128>, and may store the first to 128-th internal data ID<1:128> having the error corrected in the same memory cell. The priority of the ECS operation may mean an operation of preferentially performing an operation of correcting an error of the first to 128-th internal data ID<1:128> that have been stored in a memory cell that is selected by the first to M-th row addresses RAD<1:M> and the first to N-th column addresses CAD<1:N> that are generated from the fifth to L-th command addresses CA<5:L> that have been latched, among the plurality of memory cells (MC in FIG. 8) and storing the first to 128-th internal data ID<1:128> having the error corrected again and of correcting an error of the first to 128-th internal data ID<1:128> that have been stored by sequentially activating the plurality of memory cells and storing the first to 128-th internal data ID<1:128> having the error corrected again. The semiconductor device 20 may correct an error of the first to 128-th internal data ID<1:128> that are output from the memory cell (MC in FIG. 8) that is selected by the first to M-th row addresses RAD<1:M> and the first to N-th column addresses CAD<1:N>, among the plurality of memory cells, after the start of a read operation of a normal operation based on the chip selection signal CS and the first to L-th command addresses CA<1:L>, and may output the first to 128-th internal data ID<1:128> having the error corrected as the first to 128-th data DATA<1:128>. The semiconductor device 20 may store the first to 128-th internal data ID<1:128> that are generated from the first to 128-th data DATA<1:128> in the memory cell (MC in FIG. 8) that is selected by the first to M-th row addresses RAD<1:M> and the first to N-th column addresses CAD<1:N>, among the plurality of memory cells, after the start of a write operation of a normal operation based on the chip selection signal CS and the first to L-th command addresses CA<1:L>.

Figure 3:
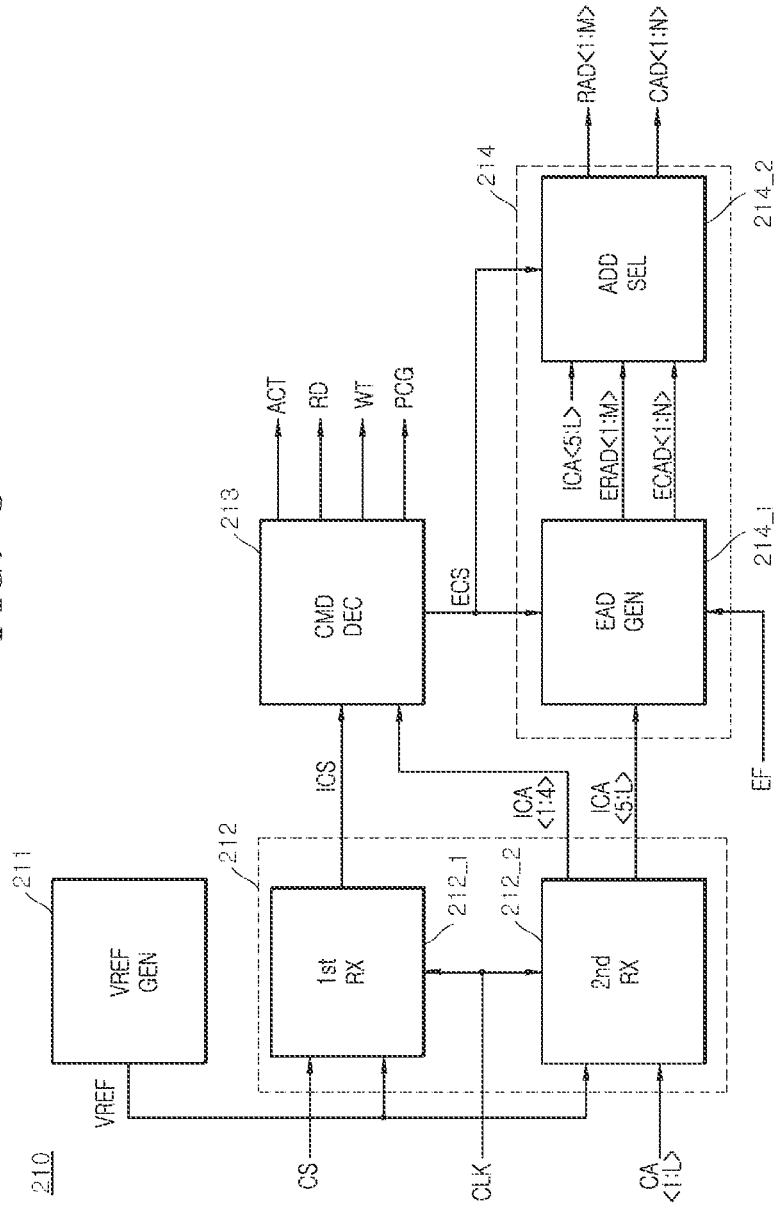
FIG. 3 is a block diagram illustrating a construction according to an embodiment of an operation control circuit that is included in the semiconductor device illustrated in FIG. 2.

FIG. 3 is a block diagram illustrating a construction according to an embodiment of the operation control circuit 210 that is included in the semiconductor device 20. The operation control circuit 210 may include a reference voltage generation circuit (VREF GEN) 211, an input circuit 212, a command decoder (CMD DEC) 213, and an address generation circuit 214.

The reference voltage generation circuit 211 may generate a reference voltage VREF having a constant voltage level. The reference voltage generation circuit 211 may generate the reference voltage VREF having a voltage level that is half of each of the logic high level and the logic low level in order to detect the logic levels of the chip selection signal CS and the first to L-th command addresses CA<1:L>. The reference voltage generation circuit 211 may be implemented as a voltage generation circuit having a constant voltage level even if process, voltage and temperature changes.

The input circuit 212 may include a first receiver (1$^{st}$ RX) 212_1 and a second receiver (2$^{nd}$ RX) 212_2. The first receiver 212_1 may generate an internal chip selection signal ICS by comparing the chip selection signal CS and the reference voltage VREF in synchronization with a rising edge of the clock CLK. The first receiver 212_1 may be implemented as a differential amplification circuit, and may generate the internal chip selection signal ICS by detecting and amplifying a difference between the voltage levels of the chip selection signal CS and the reference voltage VREF.

The second receiver 212_2 may generate first to L-th internal command addresses ICA<1:L> by comparing the first to L-th command addresses CA<1:L> and the reference voltage VREF in synchronization with a rising edge of the clock CLK. The second receiver 212_2 may generate a first group ICA<1:4> of internal command addresses by comparing the first group CA<1:4> of command addresses and the reference voltage VREF in synchronization with a rising edge of the clock CLK. The second receiver 212_2 may generate a second group ICA<5:L> of the internal command addresses by comparing the second group CA<5:L> of command addresses and the reference voltage VREF in synchronization with a rising edge of the clock CLK. The second receiver 212_2 may be implemented as a differential amplification circuit, and may generate the first to L-th internal command addresses ICA<1:L> by detecting and amplifying a difference between the voltage levels of the first to L-th command addresses CA<1:L> and the reference voltage VREF. The second receiver 212_2 has been illustrated as being only one circuit, but may be implemented as being "L" differential amplification circuits corresponding to the number of bits of the first to L-th command addresses CA<1:L>.

The command decoder 213 may generate the active command ACT for performing an active operation by decoding the internal chip selection signal ICS and the first group ICA<1:4> of internal command addresses. The command decoder 213 may generate the read command RD for performing a read operation of a normal operation and a read operation of an ECS operation by decoding the internal chip selection signal ICS and the first group ICA<1:4> of internal command addresses. The command decoder 213 may generate the write command WT for performing a write operation of a normal operation and a write operation of an ECS operation by decoding the internal chip selection signal ICS and the first group ICA<1:4> of internal command addresses. The command decoder 213 may generate the precharge command PCG for performing a precharge operation by decoding the internal chip selection signal ICS and the first group ICA<1:4> of internal command addresses. The command decoder 213 may generate an ECS command ECS for performing an ECS operation by decoding the internal chip selection signal ICS and the first group ICA<1:4> of internal command addresses.

The address generation circuit 214 may include an error address generation circuit (EAD GEN) 214_1 and an address selection circuit (ADD SEL) 214_2.

The error address generation circuit 214_1 may latch the second group ICA<5:L> of internal command addresses during an interval in which the error flag signal EF is enabled to a logic high level. The error address generation circuit 214_1 may generate first to M-th error row addresses ERAD<1:M> and first to N-th error column addresses ECAD<1:N> from the second group ICA<5:L> of internal command addresses that have been latched. The first to M-th error row addresses ERAD<1:M> may be generated from some bits of the second group ICA<5:L> of internal command addresses. The first to N-th error column addresses ECAD<1:N> may be generated from some bits of the second group ICA<5:L> of internal command addresses. The error address generation circuit 214_1 may generate the first to M-th error row addresses ERAD<1:M> and the first to N-th error column addresses ECAD<1:N> that are sequentially counted during an interval in which the ECS command ECS is enabled to a logic high level and the error flag signal EF is disabled to a logic low level. The sum of the number of bits of the first to M-th error row addresses ERAD<1:M> and the number of bits of the first to N-th error column addresses ECAD<1:N> may be set as the same number of bits of the second group ICA<5:L> of internal command addresses.

The address selection circuit 214_2 may generate the first to M-th row addresses RAD<1:M> and the first to N-th column addresses CAD<1:N> based on the second group ICA<5:L> of internal command addresses when the ECS command ECS is disabled to a logic low level. The address selection circuit 214_2 may generate the first to M-th row addresses RAD<1:M> based on the first to M-th error row addresses ERAD<1:M> when the ECS command ECS is enabled to a logic high level. The address selection circuit 214_2 may generate the first to N-th column addresses CAD<1:N> based on the first to N-th error column addresses ECAD<1:N> when the ECS command ECS is enabled to a logic high level. The sum of the number of bits of the first to M-th row addresses RAD<1:M> and the number of bits of the first to N-th column addresses CAD<1:N> may be set as the same number of bits of the second group ICA<5:L> of internal command addresses.

The address generation circuit 214 may generate the first to M-th row addresses RAD<1:M> and the first to N-th column addresses CAD<1:N> based on the second group ICA<5:L> of internal command addresses when the ECS command ECS is disabled to a logic low level. The address generation circuit 214 may latch the second group ICA<5:L> of internal command addresses when the error flag signal EF is enabled to a logic high level. The address generation circuit 214 may generate the first to M-th row addresses RAD<1:M> and the first to N-th column addresses CAD<1:N>, based on the second group ICA<5:L> of internal command addresses that have been latched, during an interval in which the ECS command ECS is enabled to a logic high level and the error flag signal EF is enabled to a logic high level. The address generation circuit 214 may generate the first to M-th row addresses RAD<1:M> and the first to N-th column addresses CAD<1:N> that are sequentially counted during an interval in which the ECS command ECS is enabled to a logic high level and the error flag signal EF is enabled to a logic low level.

Figure 4:
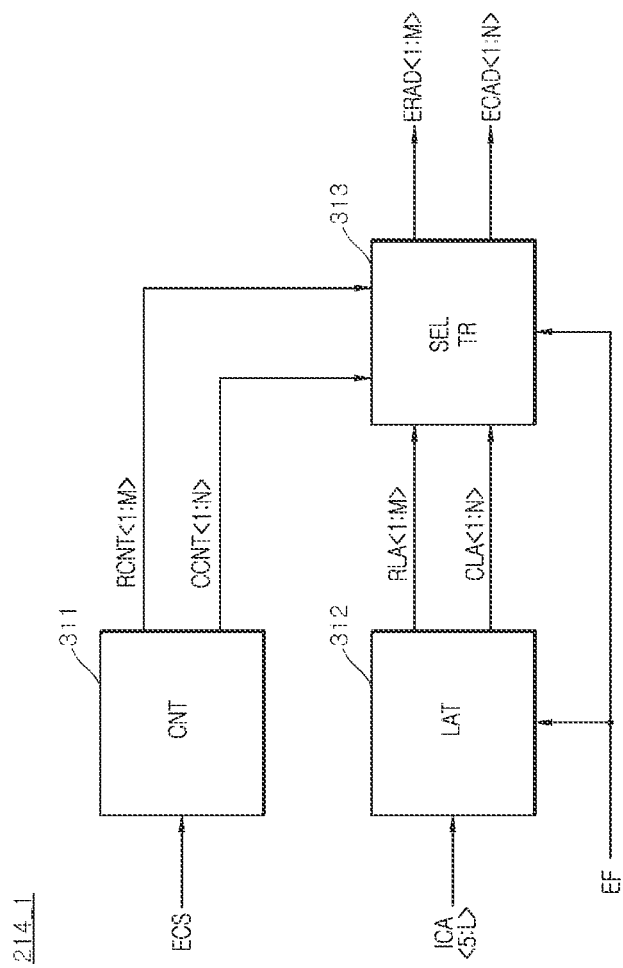
FIG. 4 is a block diagram illustrating a construction according to an embodiment of an error address generation circuit that is included in an address generation circuit illustrated in FIG. 3.

FIG. 4 is a block diagram illustrating a construction according to an embodiment of the error address generation circuit 214_1 that is included in the address generation circuit 214. The error address generation circuit 214_1 may include a counting circuit (CNT) 311, a latch circuit (LAT) 312, and a selection transfer circuit (SEL TR) 313.

The counting circuit 311 may generate first to M-th row counting signals RCNT<1:M> and first to N-th column counting signals CCNT<1:N> that are sequentially counted when the ECS command ECS is enabled to a logic high level. For example, the counting circuit 311 may generate the first to N-th column counting signals CCNT<1:N> that are sequentially counted during an interval in which the first row counting signal RCNT<1> is activated when the ECS command ECS is enabled to a logic high level. The counting circuit 311 may generate the second row counting signal RCNT2> by activating the second row counting signal RCNT2> after and up to the N-th column counting signal CCNT<N> is activated when the ECS command ECS is enabled to a logic high level. The counting circuit 311 may generate the first to M-th row counting signals RCNT<1:M> and the first to N-th column counting signals CCNT<1:N> each having a logic low level after and up to the M-th row counting signal RCNT<M> is activated and up to the N-th column counting signal CCNT<N> is activated when the ECS command ECS is enabled to a logic high level.

The latch circuit 312 may generate the first to M-th latch row addresses RLA<1:M> and the first to N-th latch column addresses CLA<1:N> by latching the second group ICA<5:L> of internal command addresses during an interval in which the error flag signal EF is enabled to a logic high level. The first to M-th latch row addresses RLA<1:M> may be generated from some bits of the second group ICA<5:L> of internal command addresses. The first to N-th latch column addresses CLA<1:N> may be generated from some bits of the second group ICA<5:L> of internal command addresses. The sum of the number of bits of the first to M-th latch row addresses RLA<1:M> and the number of bits of the first to N-th latch column addresses CLA<1:N> may be set as the same number of bits of the second group ICA<5:L> of internal command addresses.

The selection transfer circuit 313 may output the first to M-th latch row addresses RLA<1:M> as the first to M-th error row addresses ERAD<1:M> during an interval in which the error flag signal EF is enabled to a logic high level. The selection transfer circuit 313 may output the first to N-th latch column addresses CLA<1:N> as the first to N-th error column addresses ECAD<1:N> during an interval in which the error flag signal EF is enabled to a logic high level. The selection transfer circuit 313 may output the first to M-th row counting signals RCNT<1:M> as the first to M-th error row addresses ERAD<1:M> during an interval in which the error flag signal EF is disabled to a logic low level. The selection transfer circuit 313 may output the first to N-th column counting signals CCNT<1:N> as the first to N-th error column addresses ECAD<1:N> during an interval in which the error flag signal EF is disabled to a logic low level.

Figure 5:
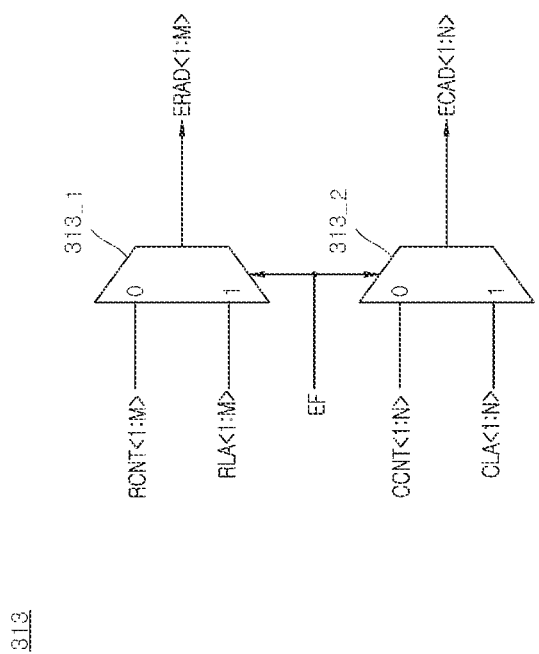
FIG. 5 is a block diagram illustrating a construction according to an embodiment of a selection transfer circuit that is included in the error address generation circuit illustrated in FIG. 4.

FIG. 5 is a block diagram illustrating a construction according to an embodiment of the selection transfer circuit 313 that is included in the error address generation circuit 214_1. The selection transfer circuit 313 may include a first multiplexer 313_1 and a second multiplexer 313_2.

The first multiplexer 313_1 may output the first to M-th latch row addresses RLA<1:M> as the first to M-th error row addresses ERAD<1:M> during an interval in which the error flag signal EF is enabled to a logic high level. The first multiplexer 313_1 may output the first to M-th row counting signals RCNT<1:M> as the first to M-th error row addresses ERAD<1:M> during an interval in which the error flag signal EF is disabled to a logic low level.

The second multiplexer 313_2 may output the first to N-th latch column addresses CLA<1:N> as the first to N-th error column addresses ECAD<1:N> during an interval in which the error flag signal EF is enabled to a logic high level. The second multiplexer 313_2 may output the first to N-th column counting signals CCNT<1:N> as the first to N-th error column addresses ECAD<1:N> during an interval in which the error flag signal EF is disabled to a logic low level.

Figure 6:
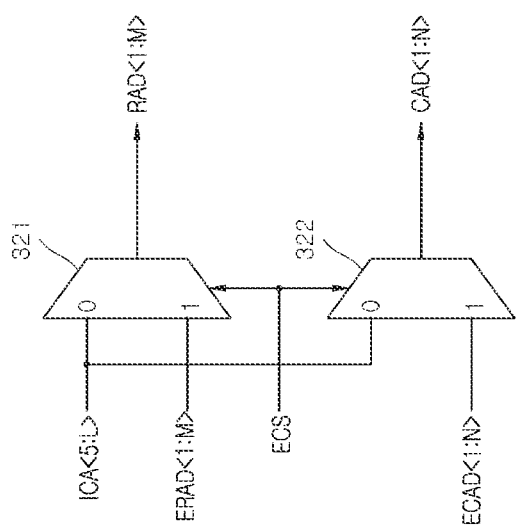
FIG. 6 is a block diagram illustrating a construction according to an embodiment of an address selection circuit that is included in the address generation circuit illustrated in FIG. 3.

FIG. 6 is a block diagram illustrating a construction according to an embodiment of the address selection circuit 214_2 that is included in the address generation circuit 214. The address selection circuit 214_2 may include a third multiplexer 321 and a fourth multiplexer 322.

The third multiplexer 321 may output the first to M-th error row addresses ERAD<1:M> as the first to M-th row addresses RAD<1:M> during an interval in which the ECS command ECS is enabled to a logic high level. The third multiplexer 321 may output some bits of the second group ICA<5:L> of internal command addresses as the first to M-th row addresses RAD<1:M> during an interval in which the ECS command ECS is disabled to a logic low level. The some bits of the second group ICA<5:L> of internal command addresses for generating the first to M-th row addresses RAD<1:M> may be set as "M" bits.

The fourth multiplexer 322 may output the first to N-th error column addresses ECAD<1:N> as the first to N-th column addresses CAD<1:N> during an interval in which the ECS command ECS is enabled to a logic high level. The fourth multiplexer 322 may output the remaining bits of the second group ICA<5:L> of internal command addresses as the first to N-th column addresses CAD<1:N> during an interval in which the ECS command ECS is disabled to a logic low level. The remaining bits of the second group ICA<5:L> of internal command addresses for generating the first to N-th column addresses CAD<1:N> may be set as "N" bits. The remaining bits of the second group ICA<5:L> of internal command addresses for generating the first to N-th column addresses CAD<1:N> may be set as bits different from the some bits of the second group ICA<5:L> of internal command addresses for generating the first to M-th row addresses RAD<1:M>.

Figure 7:
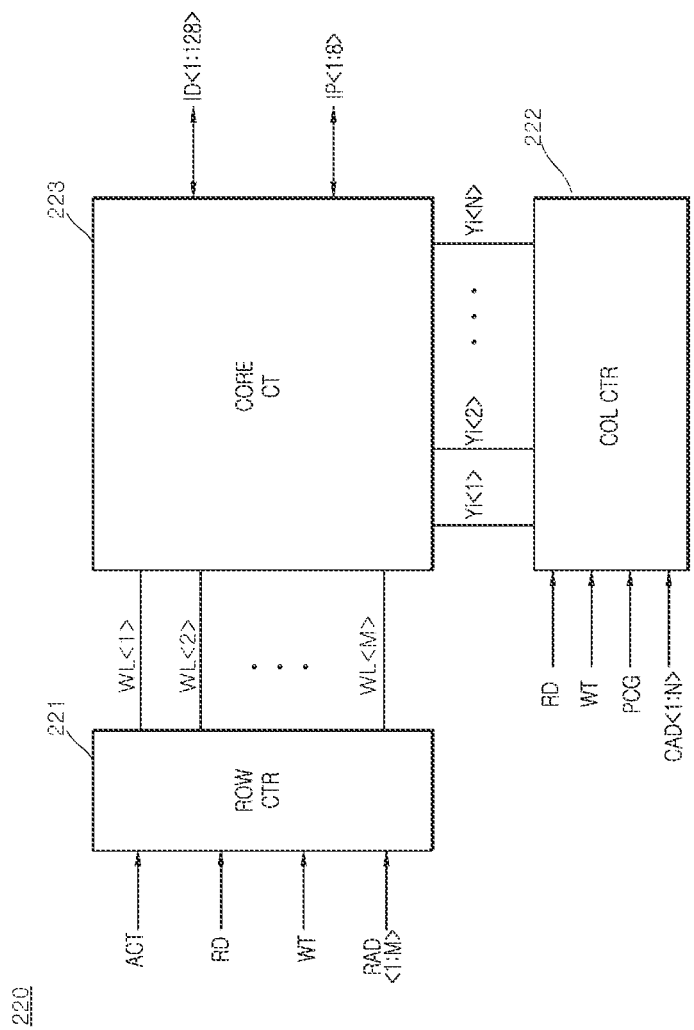
FIG. 7 is a block diagram illustrating a construction according to an embodiment of a memory circuit that is included in the semiconductor device illustrated in FIG. 2.

FIG. 7 is a block diagram illustrating a construction according to an embodiment of the memory circuit 220 that is included in the semiconductor device 20. The memory circuit 220 may include a row control circuit (ROW CTR) 221, a column control circuit (COL CTR) 222, and a core circuit (CORE CT) 223.

The row control circuit 221 may activate any one of the first to M-th word lines WL<1> to WL<M> based on the first to M-th row addresses RAD<1:M> when the active command ACT is enabled. The row control circuit 221 may activate any one of the first to M-th word lines WL<1> to WL<M> based on the first to M-th row addresses RAD<1:M> when the read command RD is enabled after the start of a read operation of a normal operation and a read operation of an ECS operation. The row control circuit 221 may activate any one of the first to M-th word lines WL<1> to WL<M> based on the first to M-th row addresses RAD<1:M> when the write command WT is enabled after the start of a write operation of a normal operation and a write operation of an ECS operation.

The column control circuit 222 may activate any one of the first to N-th column lines Yi<1> to Yi<N> based on the first to N-th column addresses CAD<1:N> when the read command RD is enabled after the start of a read operation of a normal operation and a read operation of an ECS operation. The column control circuit 222 may activate any one of the first to N-th column lines Yi<1> to Yi<N> based on the first to N-th column addresses CAD<1:N> when the write command WT is enabled after the start of a write operation of a normal operation and a write operation of an ECS operation. The column control circuit 222 may perform a precharge operation when the precharge command PCG is enabled after the start of a precharge operation.

The core circuit 223 may include the first to sixteenth mats (223_1 to 223_16 in FIG. 8) and the error storage region (223_17 in FIG. 8). The core circuit 223 may output the first to 128-th internal data ID<1:128> that have been stored in the memory cell (MC in FIG. 8) that is connected to an activated word line, among the first to M-th word lines WL<1> to WL<M>, and an activated bit line, among the first to N-th column lines Yi<1> to Yi<N>, after the start of a read operation of a normal operation and a read operation of an ECS operation. The core circuit 223 may output the first to eighth internal parities IP<1:8> that have been stored in the error cell (EC in FIG. 8) that is connected to an activated word line, among the first to M-th word lines WL<1> to WL<M>, and an activated bit line, among the first to N-th column lines Yi<1> to Yi<N>, after the start of a read operation of a normal operation and a read operation of an ECS operation. The core circuit 223 may store the first to 128-th internal data ID<1:128> in the memory cell (MC in FIG. 8) that is connected to an activated word line, among the first to M-th word lines WL<1> to WL<M>, and an activated bit line, among the first to N-th column lines Yi<1> to Yi<N>, after the start of a write operation of a normal operation and a write operation of an ECS operation. The first to eighth internal parities IP<1:8> may be set as a signal that is generated by performing an ECC encoding operation on the first to 128-th internal data ID<1:128> that are input after the start of a write operation of a normal operation.

FIG. 8 is a block diagram illustrating a construction according to an embodiment of the core circuit 223 that is included in the memory circuit 220. The core circuit 223 may include the first to sixteenth mats 223_1 to 223_16 and the error storage region 233_17.

Figure 9:
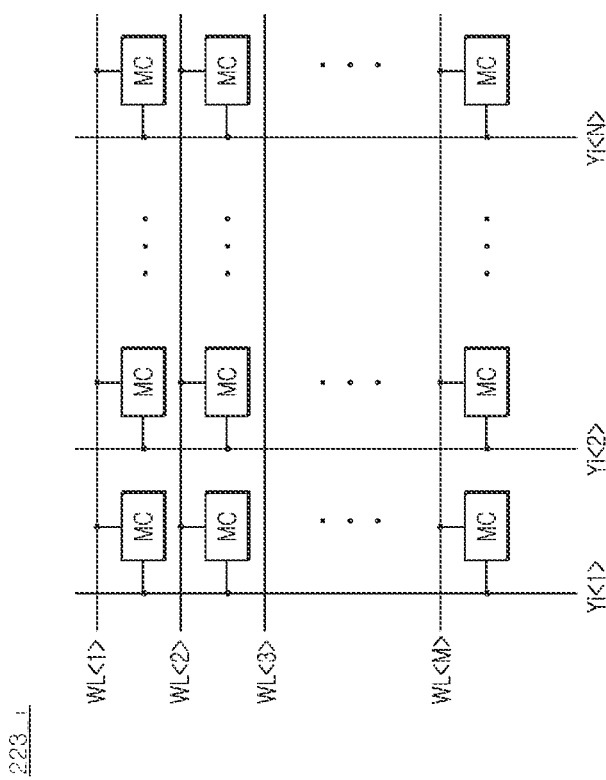
FIG. 9 is a diagram illustrating a construction according to an embodiment of a first mat that is included in the core circuit illustrated in FIG. 8.

The first to sixteenth mats 223_1 to 223_16 may each include the first to M-th word lines (WL<1> to WL<M> in FIG. 9) and the first to N-th column lines (Yi<1> to Yi<N> in FIG. 9), and may include the plurality of memory cells MC that are connected to the first to M-th word lines (WL<1> to WL<M> in FIG. 9) and the first to N-th column lines (Yi<1> to Yi<N> in FIG. 9).

The first mat 223_1 may output the first to eighth internal data ID<1:8> that have been stored in the memory cell MC that is connected to an activated word line, among the first to M-th word lines WL<1> to WL<M>, and an activated bit line, among the first to N-th column lines Yi<1> to Yi<N>, after the start of a read operation of a normal operation and a read operation of an ECS operation. The second mat 223_2 may output the ninth to sixteenth internal data ID<9:16> that have been stored in the memory cell MC that is connected to an activated word line, among the first to M-th word lines WL<1> to WL<M>, and an activated bit line, among the first to N-th column lines Yi<1> to Yi<N>, after the start of a read operation of a normal operation and a read operation of an ECS operation.

The first mat 223_1 may store the first to eighth internal data ID<1:8> in the memory cell MC that is connected to an activated word line, among the first to M-th word lines WL<1> to WL<M>, and an activated bit line, among the first to N-th column lines Yi<1> to Yi<N>, after the start of a write operation of a normal operation and a write operation of an ECS operation. The second mat 223_2 may store the ninth to sixteenth internal data ID<9:16> in the memory cell MC that is connected to an activated word line, among the first to M-th word lines WL<1> to WL<M>, and an activated bit line, among the first to N-th column lines Yi<1> to Yi<N>, after the start of a write operation of a normal operation and a write operation of an ECS operation.

The third to sixteenth mats 223_3 to 223_16 may each be implemented to have the same construction and may perform the same operation as each of the first and second mats 223_1 and 223_2 except only bits of the internal data that are input and output, and thus a detailed description thereof is omitted. The first to sixteenth mats 223_1 to 223_16 may each input and output 8-bit internal data.

The error storage region 223_17 may include the first to M-th word lines (WL<1> to WL<M> in FIG. 9) and the first to N-th column lines (Yi<1> to Yi<N> in FIG. 9), and may include the plurality of error cells EC that are connected to the first to M-th word lines (WL<1> to WL<M> in FIG. 9) and the first to N-th column lines (Yi<1> to Yi<N> in FIG. 9).

The error storage region 223_17 may output the first to eighth internal parities IP<1:8> that have been stored in the error cell EC that is connected to an activated word line, among the first to M-th word lines WL<1> to WL<M>, and an activated bit line, among the first to N-th column lines Yi<1> to Yi<N>, after the start of a read operation of a normal operation and a read operation of an ECS operation.

The error storage region 223_17 may store the first to eighth internal parities IP<1:8> in the error cell EC that is connected to an activated word line, among the first to M-th word lines WL<1> to WL<M>, and an activated bit line, among the first to N-th column lines Yi<1> to Yi<N>, after the start of a write operation of a normal operation.

The error storage region 223_17 may be implemented to have the same construction and may perform the same operation as each of the first to sixteenth mats 223_1 to 223_16 except that the error storage region 223_17 merely inputs and outputs the internal parities instead of the internal data differently from each of the first to sixteenth mats 223_1 to 223_16, and thus a detailed description thereof is omitted.

FIG. 9 is a diagram illustrating a construction according to an embodiment of the first mat 223_1 that is included in the core circuit 223.

The first mat 223_1 may include the first to M-th word lines WL<1> to WL<M> and the first to N-th column lines Yi<1> to Yi<N>. The first mat 223_1 may include the plurality of memory cells MC at which the first to M-th word lines WL<1> to WL<M> and the first to N-th column lines Yi<1> to Yi<N> are intersected and that are connected to the first to M-th word lines WL<1> to WL<M> and the first to N-th column lines Yi<1> to Yi<N>.

Any one of the first to M-th word lines WL<1> to WL<M> of the first mat 223_1 may be activated by the first to M-th row addresses RAD<1:M>. Any one of the first to N-th column lines Yi<1> to Yi<N> of the first mat 223_1 may be activated by the first to N-th column addresses CAD<1:N>.

The first mat 223_1 may output the first to eighth internal data ID<1:8> that have been stored in the memory cell MC that is connected to an activated word line and an activated column line after the start of a read operation of a normal operation. The first mat 223_1 may store the first to eighth internal data ID<1:8> in the memory cell MC that is connected to an activated word line and an activated column line after the start of a write operation of a normal operation.

The first mat 223_1 may output the first to eighth internal data ID<1:8> that have been stored in the memory cell MC that is connected to an activated word line and an activated column line after the start of a read operation of an ECS operation. The first mat 223_1 may store the first to eighth internal data ID<1:8> in the memory cell MC that is connected to an activated word line and an activated column line after the start of a write operation of an ECS operation.

The first mat 223_1 may perform a precharge operation after the start of a precharge operation.

The second to sixteenth mats 223_2 to 223_16 may each be implemented to have the same construction and may perform the same operation as the first mat 223_1 except only bits of the internal data that are input and output, and thus a detailed description thereof is omitted. The error storage region 223_17 may be implemented to have the same construction and may perform the same operation as the first mat 223_1 except that the error storage region 223_17 merely inputs and outputs the internal parity instead of the internal data differently from the first mat 223_1, and thus a detailed description thereof is omitted.

Figure 10:
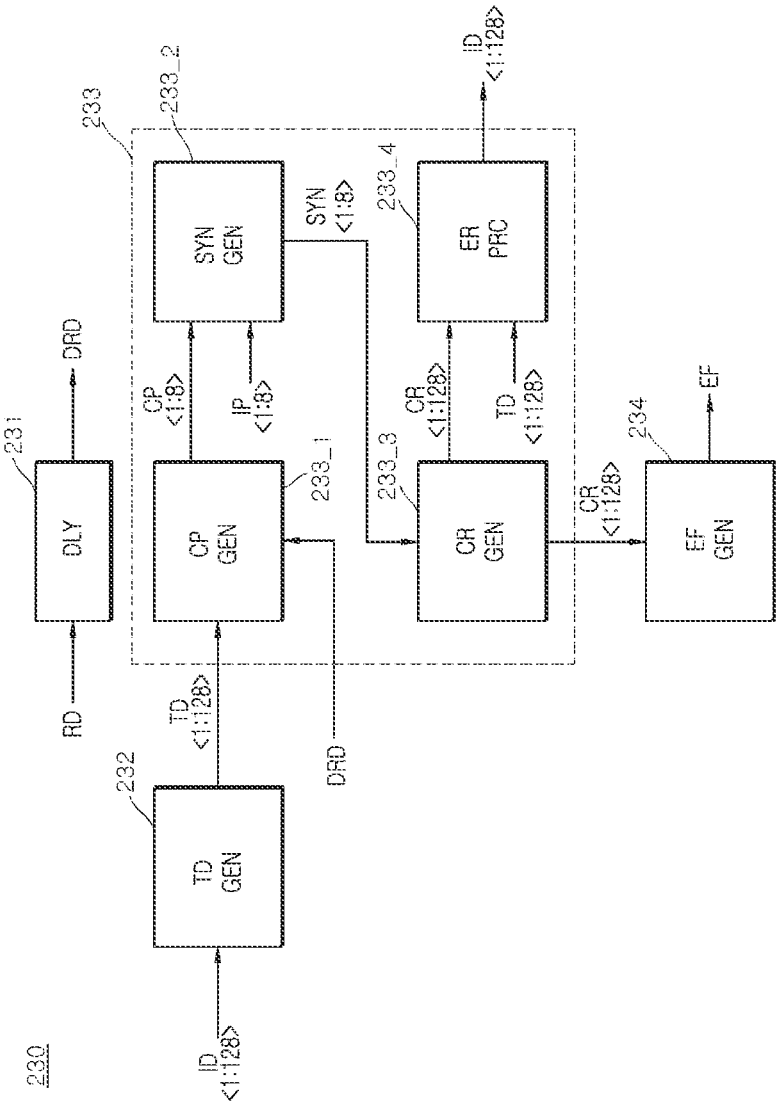
FIG. 10 is a block diagram illustrating a construction according to an embodiment in which the ECS control circuit that is included in the semiconductor device illustrated in FIG. 2 performs a read operation of a normal operation and an ECS operation.

FIG. 10 is a block diagram illustrating a construction according to an embodiment in which the ECS control circuit 230 that is included in the semiconductor device 20 performs a read operation of a normal operation and an ECS operation. The ECS control circuit 230 may include a delay circuit (DLY) 231, a transfer data generation circuit (TD GEN) 232, an error correction circuit 233, and an error flag signal generation circuit (EF GEN) 234.

The delay circuit 231 may generate a read delay signal DRD by delaying the read command RD. The delay circuit 231 may generate the read delay signal DRD by delaying the read command RD as much as the time that is taken for all the first to 128-th internal data ID<1:128> to be output from the memory circuit 220.

The transfer data generation circuit 232 may generate first to 128-th transfer data TD<1:128> by buffering the first to 128-th internal data ID<1:128> that are output from the memory circuit 220 after the start of a read operation of a normal operation. The transfer data generation circuit 232 may generate the first to 128-th transfer data TD<1:128> by buffering the first to 128-th internal data ID<1:128> that are output from the memory circuit 220 after the start of a read operation of an ECS operation. The transfer data generation circuit 232 may be implemented to output, to the memory circuit 220, the first to 128-th internal data ID<1:128> that are generated from the first to 128-th data DATA<1:128> that are input after the start of a write operation of a normal operation.

The error correction circuit 233 may include an operation parity generation circuit (CP GEN) 233_1, a syndrome generation circuit (SYN GEN) 233_2, an error correction signal generation circuit (CR GEN) 233_3, and an error processing circuit (ER PRC) 233_4.

The operation parity generation circuit 233_1 may generate first to eighth operation parities CP<1:8> that include information with regard to an error of the first to 128-th transfer data TD<1:128> when the read delay signal DRD is enabled to a logic high level. The operation parity generation circuit 233_1 may generate the first to eighth operation parities CP<1:8> based on the first to 128-th transfer data TD<1:128> when the read delay signal DRD is enabled to a logic high level. The operation parity generation circuit 233_1 may generate the first to eighth operation parities CP<1:8> by performing an ECC encoding operation based on the first to 128-th transfer data TD<1:128> after the start of a read operation of a normal operation. The operation parity generation circuit 233_1 may generate the first to eighth operation parities CP<1:8> by performing an ECC encoding operation on the first to 128-th transfer data TD<1:128> after the start of a read operation of an ECS operation. The operation parity generation circuit 233_1 may be implemented to generate the first to eighth internal parities IP<1:8> by performing an ECC encoding operation on the first to 128-th internal data ID<1:128> that are generated from the first to 128-th data DATA<1:128> that are input after the start of a write operation of a normal operation. The operation parity generation circuit 233_1 may be implemented to output the first to eighth internal parities IP<1:8> to the memory circuit 220 after the start of a write operation of a normal operation.

The ECC encoding operation may be set as an operation of a common error correction circuit comparing the bits of data by using an error correction code (ECC) and generating a parity bit based on a result of the comparison.

The syndrome generation circuit 233_2 may generate first to eighth syndromes SYN<1:8> by comparing the first to eighth operation parities CP<1:8> and the first to eighth internal parities IP<1:8> after the start of a read operation of a normal operation. The syndrome generation circuit 233_2 may generate the first to eighth syndromes SYN<1:8> by comparing the first to eighth operation parities CP<1:8> and the first to eighth internal parities IP<1:8> after the start of a read operation of an ECS operation.

The error correction signal generation circuit 233_3 may generate first to 128-th error correction signals CR<1:128> by performing an ECC decoding operation on the first to eighth syndromes SYN<1:8>.

The ECC decoding operation may be set as an operation of a common error correction circuit generating a syndrome bit by comparing parity bits of data that are generated in an ECC encoding operation and parity bits that are generated at previous timing by using an ECC and correcting an error that is included in the data by decoding the syndrome bit.

The error processing circuit 233_4 may correct an error of the first to 128-th transfer data TD<1:128> based on the first to 128-th error correction signals CR<1:128>, and may output the first to 128-th transfer data TD<1:128> having the error corrected as the first to 128-th internal data ID<1:128>. The error processing circuit 233_4 may output the first to 128-th internal data ID<1:128> having the error corrected to the data input and output circuit 240 after the start of a read operation of a normal operation. The error processing circuit 233_4 may output the first to 128-th internal data ID<1:128> having the error corrected to the memory circuit 220 after the start of a write operation of an ECS operation.

The error correction circuit 233 may detect an error of the first to 128-th transfer data TD<1:128> when the read delay signal DRD is enabled, may correct an error of the first to 128-th transfer data TD<1:128>, and may output the first to 128-th transfer data TD<1:128> having the error corrected as the first to 128-th internal data ID<1:128>. The error correction circuit 233 may correct an error of the first to 128-th transfer data TD<1:128> by performing an ECC encoding operation and an ECC decoding operation on the first to 128-th transfer data TD<1:128> when the read delay signal DRD is enabled, and may output the first to 128-th transfer data TD<1:128> having the error corrected as the first to 128-th internal data ID<1:128>. The error correction circuit 233 may output the first to 128-th internal data ID<1:128> having the error corrected to the data input and output circuit 240 after the start of a read operation of a normal operation. The error correction circuit 233 may output the first to 128-th internal data ID<1:128> having the error corrected to the memory circuit 220 after the start of a write operation of an ECS operation.

The error flag signal generation circuit 234 may generate the error flag signal EF that is enabled based on the first to 128-th error correction signals CR<1:128>. The error flag signal generation circuit 234 may generate the error flag signal EF that is enabled to a logic high level when at least any one of the first to 128-th error correction signals CR<1:128> is generated to have a logic high level. The error flag signal generation circuit 234 may correct an error of the first to 128-th internal data ID<1:128>, may store the first to 128-th internal data ID<1:128> having the error corrected again, and may then generate the error flag signal EF that is disabled to a logic low level.

Figure 11:
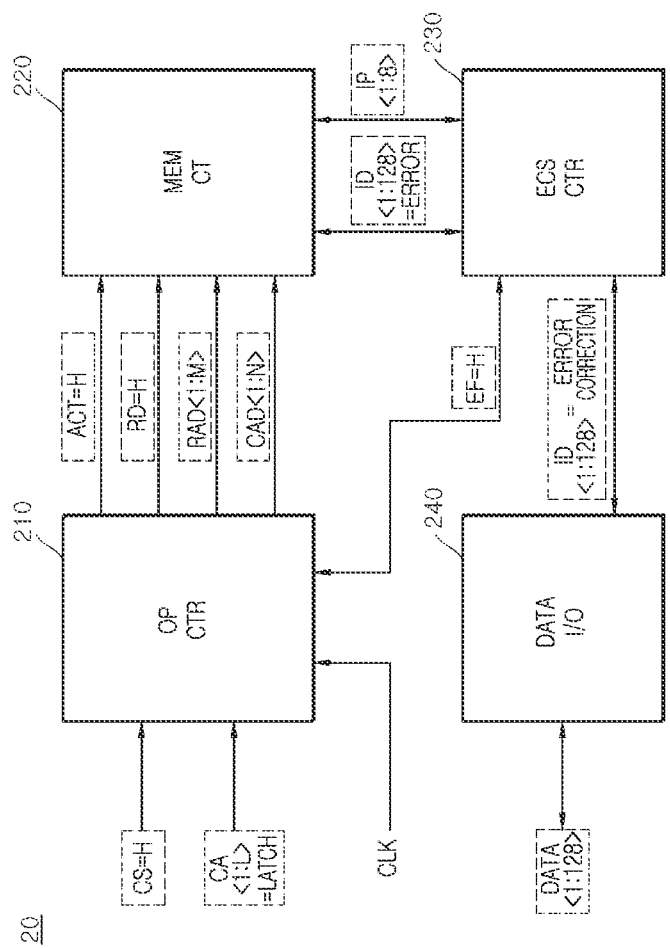
FIG. 11 is a diagram for describing a read operation of the semiconductor device according to an embodiment of the present disclosure.

FIG. 11 is a diagram for describing a read operation of the semiconductor device according to an embodiment of the present disclosure. The read operation of the semiconductor device 20 according to an embodiment of the present disclosure is described with reference to FIG. 11. In this case, a case in which an error occurs in the first to 128-th internal data ID<1:128> may be described as follows as an example.

The operation control circuit 210 may generate the active command ACT that is enabled to a logic high level when the chip selection signal CS and the first group CA<1:4> of command addresses each have a logic level combination for an active operation in synchronization with the clock CLK. The operation control circuit 210 may generate the first to M-th row addresses RAD<1:M> and the first to N-th column addresses CAD<1:N> based on the first group CA<1:L> of command addresses after the start of a read operation of a normal operation.

The memory circuit 220 may perform an active operation for activating any one of the plurality of word lines (WL<1> to WL<M> in FIG. 9) based on the first to M-th row addresses RAD<1:M> when the active command ACT is enabled.

The operation control circuit 210 may generate the read command RD that is enabled to a logic high level when the chip selection signal CS and the first group CA<1:4> of command addresses each have a logic level combination for the read operation of the normal operation in synchronization with the clock CLK.

The memory circuit 220 may output the first to 128-th internal data ID<1:128> and the first to eighth internal parities IP<1:8> that have been stored in a memory cell that is selected by the first to M-th row addresses RAD<1:M> and the first to N-th column addresses CAD<1:N>, among the plurality of memory cells (MC in FIG. 8), when the read command RD is enabled after the start of the read operation of the normal operation. At this time, an error ERROR may occur in the first to 128-th internal data ID<1:128>.

The ECS control circuit 230 may correct (ERROR CORRECTION) the error of the first to 128-th internal data ID<1:128> based on the first to 128-th internal data ID<1:128> and the first to eighth internal parities IP<1:8> after the start of the read operation of the normal operation. The ECS control circuit 230 may output the first to 128-th internal data ID<1:128> having the error corrected to the data input and output circuit 240 after the start of the read operation of the normal operation. The ECS control circuit 230 may generate the error flag signal EF that is enabled to a logic high level when the error occurs in the first to 128-th internal data ID<1:128> after the start of the read operation of the normal operation.

The operation control circuit 210 may generate the first to M-th latch row addresses (RLA<1:M> in FIG. 4) and the first to N-th latch column addresses (CLA<1:N> in FIG. 4) by latching (LATCH) the second group CA<5:L> of command addresses when the error flag signal EF is enabled to a logic high level after the start of the read operation of the normal operation.

The data input and output circuit 240 may output the first to 128-th internal data ID<1:128> having the error corrected as the first to 128-th data DATA<1:128> after the start of the read operation of the normal operation.

Figure 12:
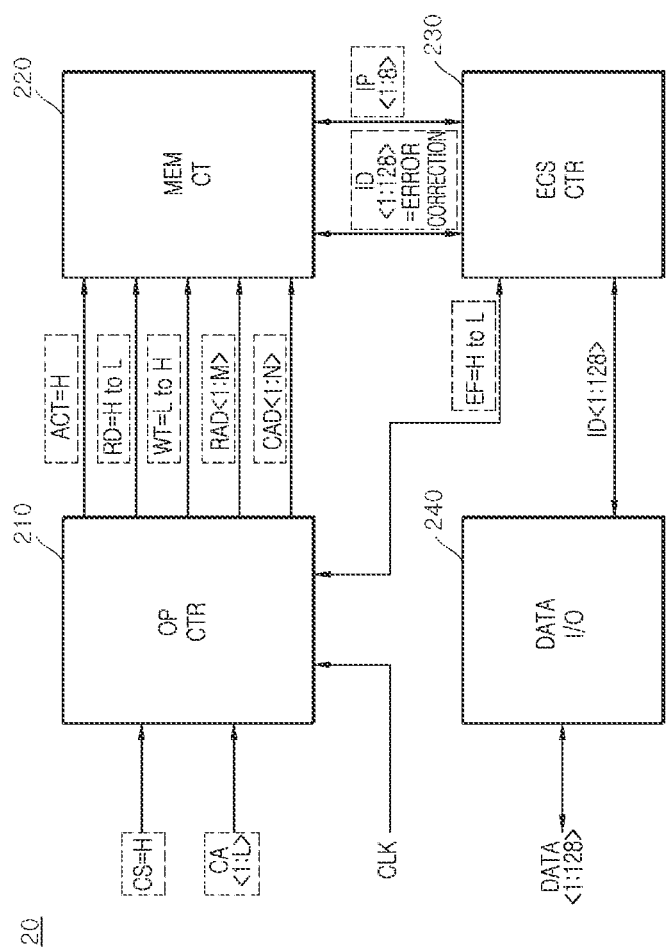
FIG. 12 is a diagram for describing an ECS operation of the semiconductor device according to an embodiment of the present disclosure.

FIG. 12 is a diagram for describing an ECS operation of the semiconductor device according to an embodiment of the present disclosure. The ECS operation of the semiconductor device 20 according to an embodiment of the present disclosure is described with reference to FIG. 12. In this case, a case in which an error occurs in the first to 128-th internal data ID<1:128> after the start of a read operation of a normal operation may be described as follows as an example.

The operation control circuit 210 may generate the active command ACT that is enabled to a logic high level when the chip selection signal CS and the first group CA<1:4> of command addresses each have a logic level combination for an active operation in synchronization with the clock CLK. The operation control circuit 210 may generate the first to M-th row addresses RAD<1:M> and the first to N-th column addresses CAD<1:N>, based on the first to M-th latch row addresses (RLA<1:M> in FIG. 4) and the first to N-th latch column addresses (CLA<1:N> in FIG. 4) that have been latched after the start of a read operation of an ECS operation.

The memory circuit 220 may perform the active operation for activating any one of the plurality of word lines (WL<1> to WL<M> in FIG. 9) based on the first to M-th row addresses RAD<1:M> when the active command ACT is enabled.

The operation control circuit 210 may generate the read command RD that is enabled to a logic high level when the chip selection signal CS and the first group CA<1:4> of command addresses each have a logic level combination for the read operation of an ECS operation in synchronization with the clock CLK. The operation control circuit 210 may generate the write command WT that is disabled to a logic low level when the chip selection signal CS and the first group CA<1:4> of command addresses each have the logic level combination for the read operation of the ECS operation in synchronization with the clock CLK.

The memory circuit 220 may output the first to 128-th internal data ID<1:128> and the first to eighth internal parities IP<1:8> that have been stored in a memory cell that is selected by the first to M-th row addresses RAD<1:M> and the first to N-th column addresses CAD<1:N>, among the plurality of memory cells (MC in FIG. 8), when the read command RD is enabled after the start of the read operation of the ECS operation. At this time, an error ERROR may occur in the first to 128-th internal data ID<1:128>.

The ECS control circuit 230 may correct (ERROR CORRECTION) the error of the first to 128-th internal data ID<1:128> based on the first to 128-th internal data ID<1:128> and the first to eighth internal parities IP<1:8> after the start of the read operation of the ECS operation.

The operation control circuit 210 may generate the write command WT that is enabled to a logic high level when the chip selection signal CS and the first group CA<1:4> of command addresses each have a logic level combination for a write operation of the ECS operation in synchronization with the clock CLK. The operation control circuit 210 may generate the read command RD that is disabled to a logic low level when the chip selection signal CS and the first group CA<1:4> of command addresses each have the logic level combination for the write operation of the ECS operation in synchronization with the clock CLK.

The ECS control circuit 230 may output the first to 128-th internal data ID<1:128> having the error corrected to the memory circuit 220 after the start of the write operation of the ECS operation. The ECS control circuit 230 may correct the error of the first to 128-th internal data ID<1:128>, store the first to 128-th internal data ID<1:128> having the error corrected in the memory circuit 220 again, and then generate the error flag signal EF that is disabled to a logic low level, after the start of the write operation of the ECS operation.

The operation control circuit 210 may generate the read command RD and the write command WT that are sequentially enabled in order to repeatedly perform the read operation and write operation of the ECS operation. The operation control circuit 210 may generate the first to M-th row addresses RAD<1:M> and the first to N-th column addresses CAD<1:N> that are sequentially counted in order to repeatedly perform the read operation and write operation of the ECS operation when the error flag signal EF is disabled to a logic low level.

The memory circuit 220 may output the first to 128-th internal data ID<1:128> and the first to eighth internal parities IP<1:8> based on the first to M-th row addresses RAD<1:M> and the first to N-th column addresses CAD<1:N> after the start of the read operation of the ECS operation. The memory circuit 220 may store the first to 128-th internal data ID<1:128> having the error corrected based on the first to M-th row addresses RAD<1:M> and the first to N-th column addresses CAD<1:N> after the start of the write operation of the ECS operation.

The ECS control circuit 230 may correct (ERROR CORRECTION) the error of the first to 128-th internal data ID<1:128> based on the first to 128-th internal data ID<1:128> and the first to eighth internal parities IP<1:8> after the start of the read operation of the ECS operation. The ECS control circuit 230 may output the first to 128-th internal data ID<1:128> having the error corrected to the memory circuit 220 after the start of the write operation of the ECS operation.

The semiconductor system 1 according to the embodiment of the present disclosure can set the priority of an ECS operation by latching the command addresses CA<5:L> when an error occurs in the first to 128-th internal data ID<1:128> after the start of a read operation of a normal operation, preferentially performing an ECS operation on a memory cell corresponding to the command addresses CA<5:L> that have been latched after the start of the ECS operation, and then sequentially performing the ECS operation on the plurality of memory cells. In an embodiment, the semiconductor system 1 can rapidly correct an error of the first to 128-th internal data ID<1:128> by latching the command addresses CA<5:L> when an error occurs in the first to 128-th internal data ID<1:128> after the start of a read operation of a normal operation, preferentially performing an ECS operation on a memory cell corresponding to the command addresses CA<5:L> that have been latched after the start of the ECS operation, and then sequentially performing the ECS operation on the plurality of memory cells.

Figure 13:
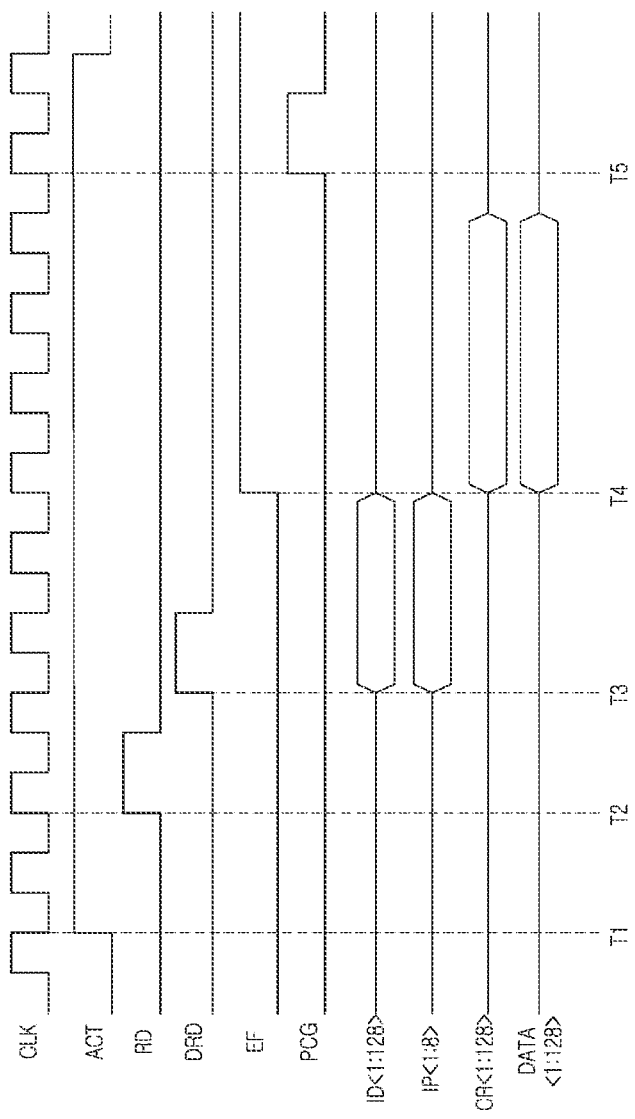
FIG. 13 is a timing diagram for describing a read operation of the semiconductor device according to an embodiment of the present disclosure.

FIG. 13 is a timing diagram for describing a read operation of the semiconductor device according to an embodiment of the present disclosure. The read operation of the semiconductor device 20 according to an embodiment of the present disclosure may be described with reference to FIG. 13. In this case, a case in which an error occurs in the first to 128-th internal data ID<1:128> may be described as follows as an example.

At timing T1, the operation control circuit 210 may generate the active command ACT having a logic high level for an active operation by decoding the chip selection signal CS and the first group CA<1:4> of command addresses in synchronization with the clock CLK. The operation control circuit 210 may generate the first to M-th row addresses RAD<1:M> and the first to N-th column addresses CAD<1:N> based on the second group CA<5:L> of command addresses after the start of the active operation of a normal operation.

The memory circuit 220 may perform the active operation for activating any one of the plurality of word lines (WL<1> to WL<M> in FIG. 9) based on the first to M-th row addresses RAD<1:M> when the active command ACT is enabled.

At timing T2, the operation control circuit 210 may generate the read command RD having a logic high level for a read operation of the normal operation by decoding the chip selection signal CS and the first group CA<1:4> of command addresses in synchronization with the clock CLK.

At timing T3, the delay circuit 231 of the ECS control circuit 230 may generate the read delay signal DRD having a logic high level by delaying the read command RD as much as the time that is taken for all the first to 128-th internal data ID<1:128> to be output from the memory circuit 220.

The memory circuit 220 may output the first to 128-th internal data ID<1:128> and the first to eighth internal parities IP<1:8> that have been stored in a memory cell that is selected by the first to M-th row addresses RAD<1:M> and the first to N-th column addresses CAD<1:N>, among the plurality of memory cells (MC in FIG. 8), when the read command RD is enabled after the start of the read operation of the normal operation. At this time, an error ERROR may occur in the first to 128-th internal data ID<1:128>.

The transfer data generation circuit 232 of the ECS control circuit 230 may generate the first to 128-th transfer data TD<1:128> by buffering the first to 128-th internal data ID<1:128> that are output from the memory circuit 220 after the start of the read operation of the normal operation.

The error correction circuit 233 of the ECS control circuit 230 may perform an ECC encoding operation and an ECC decoding operation on the first to 128-th transfer data TD<1:128> when the read delay signal DRD is enabled to a logic high level.

At timing T4, the error correction circuit 233 of the ECS control circuit 230 may generate the first to 128-th error correction signals CR<1:128> according to the ECC encoding operation and the ECC decoding operation for the first to 128-th transfer data TD<1:128>. The error correction circuit 233 of the ECS control circuit 230 may generate the first to 128-th internal data ID<1:128> by correcting the error of the first to 128-th transfer data TD<1:128> based on the first to 128-th error correction signals CR<1:128>. The error correction circuit 233 of the ECS control circuit 230 may output the first to 128-th internal data ID<1:128> having the error corrected as the data input and output circuit 240.

The error flag signal generation circuit 234 may generate the error flag signal EF that is enabled to a logic high level when at least any one of the first to 128-th error correction signals CR<1:128> is generated to have a logic high level.

The operation control circuit 210 may generate the first to M-th latch row addresses (RLA<1:M> in FIG. 4) and the first to N-th latch column addresses (CLA<1:N> in FIG. 4) by latching the second group CA<5:L> of command addresses when the error flag signal EF is enabled to a logic high level after the start of the read operation of the normal operation.

The data input and output circuit 240 may output the first to 128-th internal data ID<1:128> having the error corrected as the first to 128-th data DATA<1:128> after the start of the read operation of the normal operation.

At timing T5, the operation control circuit 210 may generate the precharge command PCG having a logic high level for a precharge operation by decoding the chip selection signal CS and the first group CA<1:4> of command addresses in synchronization with the clock CLK.

The memory circuit 220 may perform the precharge operation when the precharge command PCG is enabled to a logic high level.

Figure 14:
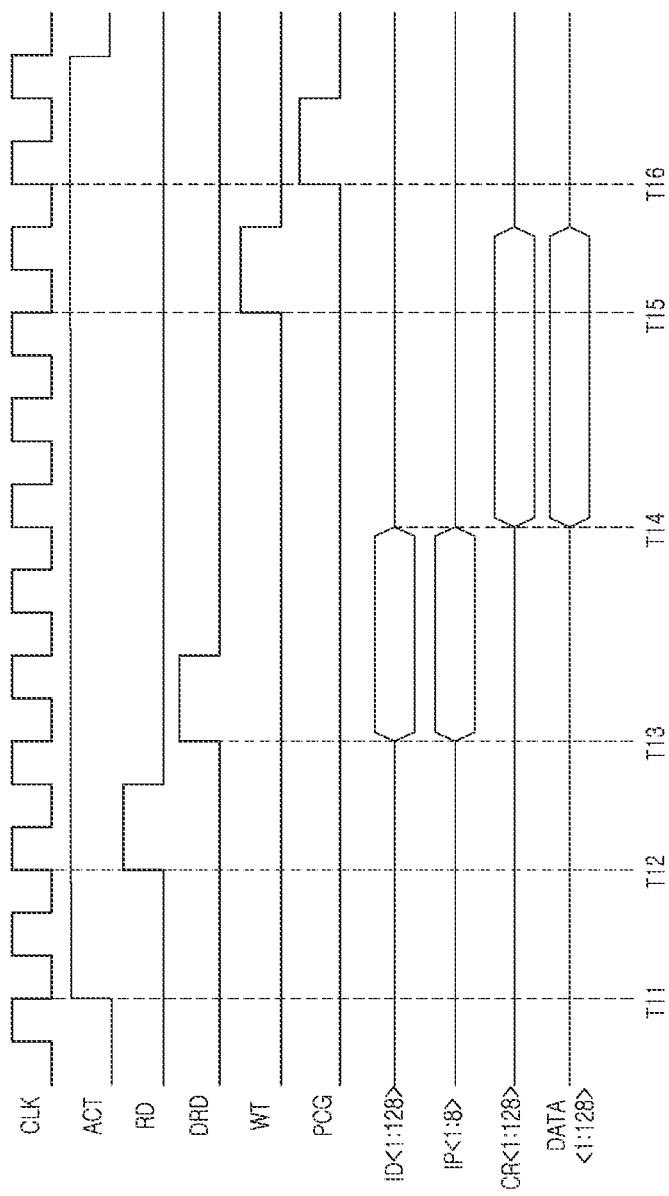
FIG. 14 is a timing diagram for describing an ECS operation of the semiconductor device according to an embodiment of the present disclosure.

FIG. 14 is a timing diagram for describing an ECS operation of the semiconductor device according to an embodiment of the present disclosure. The ECS operation of the semiconductor device 20 according to an embodiment of the present disclosure may be described with reference to FIG. 14. In this case, a case in which an error occurs in the first to 128-th internal data ID<1:128> after the start of a read operation of a normal operation may be described as follows as an example.

At timing T11, the operation control circuit 210 may generate the active command ACT having a logic high level for an active operation by decoding the chip selection signal CS and the first group CA<1:4> of command addresses in synchronization with the clock CLK. The operation control circuit 210 may generate the first to M-th row addresses RAD<1:M> and the first to N-th column addresses CAD<1:N> based on the second group CA<5:L> of command addresses after the start of the active operation of an ECS operation.

The memory circuit 220 may perform the active operation for activating any one of the plurality of word lines (WL<1> to WL<M> in FIG. 9) based on the first to M-th row addresses RAD<1:M> when the active command ACT is enabled.

At timing T12, the operation control circuit 210 may generate the read command RD having a logic high level for a read operation by decoding the chip selection signal CS and the first group CA<1:4> of command addresses in synchronization with the clock CLK.

At timing T13, the delay circuit 231 of the ECS control circuit 230 may generate the read delay signal DRD having a logic high level by delaying the read command RD as much as the time that is taken for all the first to 128-th internal data ID<1:128> to be output from the memory circuit 220.

The memory circuit 220 may output the first to 128-th internal data ID<1:128> and the first to eighth internal parities IP<1:8> that have been stored in a memory cell that is selected by the first to M-th row addresses RAD<1:M> and the first to N-th column addresses CAD<1:N>, among the plurality of memory cells (MC in FIG. 8), when the read command RD is enabled after the start of the read operation of the ECS operation. At this time, an error ERROR may occur in the first to 128-th internal data ID<1:128>.

The transfer data generation circuit 232 of the ECS control circuit 230 may generate the first to 128-th transfer data TD<1:128> by buffering the first to 128-th internal data ID<1:128> that are output from the memory circuit 220 after the start of the read operation of the ECS operation.

The error correction circuit 233 of the ECS control circuit 230 may perform an ECC encoding operation and an ECC decoding operation on the first to 128-th transfer data TD<1:128> when the read delay signal DRD is enabled to a logic high level.

At timing T14, the error correction circuit 233 of the ECS control circuit 230 may generate the first to 128-th error correction signals CR<1:128> according to the ECC encoding operation and the ECC decoding operation for the first to 128-th transfer data TD<1:128>. The error correction circuit 233 of the ECS control circuit 230 may generate the first to 128-th internal data ID<1:128> by correcting the error of the first to 128-th transfer data TD<1:128> based on the first to 128-th error correction signals CR<1:128>. The error correction circuit 233 of the ECS control circuit 230 may output the first to 128-th internal data ID<1:128> having the error corrected to the memory circuit 220.

At timing T15, the operation control circuit 210 may generate the write command WT having a logic high level for a write operation by decoding the chip selection signal CS and the first group CA<1:4> of command addresses in synchronization with the clock CLK.

The memory circuit 220 may store the first to 128-th internal data ID<1:128> having the error corrected in the memory cell that is selected by the first to M-th row addresses RAD<1:M> and the first to N-th column addresses CAD<1:N>, among the plurality of memory cells (MC in FIG. 8), when the write command WT is enabled after the start of the write operation of the ECS operation. In this case, the memory cell (MC in FIG. 8) in which the first to 128-th internal data ID<1:128> having the error corrected are stored may be the same memory cell as a memory cell from which the first to 128-th internal data ID<1:128> having the error occurred have been output after the start of the read operation of the ECS operation.

The error flag signal generation circuit 234 may correct an error of the first to 128-th internal data ID<1:128>, may store the first to 128-th internal data ID<1:128> having the error corrected again, and may generate the error flag signal EF that is disabled to a logic low level.

At timing T16, the operation control circuit 210 may generate the precharge command PCG having a logic high level for a precharge operation by decoding the chip selection signal CS and the first group CA<1:4> of command addresses in synchronization with the clock CLK.

The memory circuit 220 may perform the precharge operation when the precharge command PCG is enabled to a logic high level.

Thereafter, the operation control circuit 210 may generate the first to M-th row addresses RAD<1:M> and the first to N-th column addresses CAD<1:N> that are sequentially counted after the start of an ECS operation.

The memory circuit 220 may output the first to 128-th internal data ID<1:128> and the first to eighth internal parities IP<1:8> that have been stored in a memory cell that is selected by the first to M-th row addresses RAD<1:M> and the first to N-th column addresses CAD<1:N>, among the plurality of memory cells (MC in FIG. 8), when the read command RD is enabled after the start of a read operation of the ECS operation.

The ECS control circuit 230 may correct the error of the first to 128-th internal data ID<1:128> based on the first to 128-th internal data ID<1:128> and the first to eighth internal parities IP<1:8> after the start of the read operation of the ECS operation.

The ECS control circuit 230 may output the first to 128-th internal data ID<1:128> having the error corrected to the memory circuit 220 in order to store the first to 128-th internal data ID<1:128> having the error corrected in the memory cell (MC in FIG. 8) again after the start of a write operation of the ECS operation.

The memory circuit 220 may store the first to 128-th internal data ID<1:128> having the error corrected in the memory cell that is selected by the first to M-th row addresses RAD<1:M> and the first to N-th column addresses CAD<1:N>, among the plurality of memory cells (MC in FIG. 9), when the write command WT is enabled after the start of the write operation of the ECS operation.

The read operation and write operation of the ECS operation may be repeatedly performed until an operation of correcting an error of internal data that have been stored in all the memory cells (MC in FIG. 8) and storing the internal data having the error corrected again is completed.

The semiconductor system 1 according to the embodiment of the present disclosure can set the priority of an ECS operation by latching the command addresses CA<5:L> when an error occurs in the first to 128-th internal data ID<1:128> after the start of a read operation of a normal operation, preferentially performing the ECS operation on a memory cell corresponding to the command addresses CA<5:L> that have been latched after the start of the ECS operation, and then sequentially performing the ECS operation on the plurality of memory cells. In an embodiment, the semiconductor system 1 can rapidly correct an error of the first to 128-th internal data ID<1:128> by latching the command addresses CA<5:L> when an error occurs in the first to 128-th internal data ID<1:128> after the start of a read operation of a normal operation, preferentially performing an ECS operation on a memory cell corresponding to the command addresses CA<5:L> that have been latched after the start of the ECS operation, and then sequentially performing the ECS operation on the plurality of memory cells.

Figure 15:
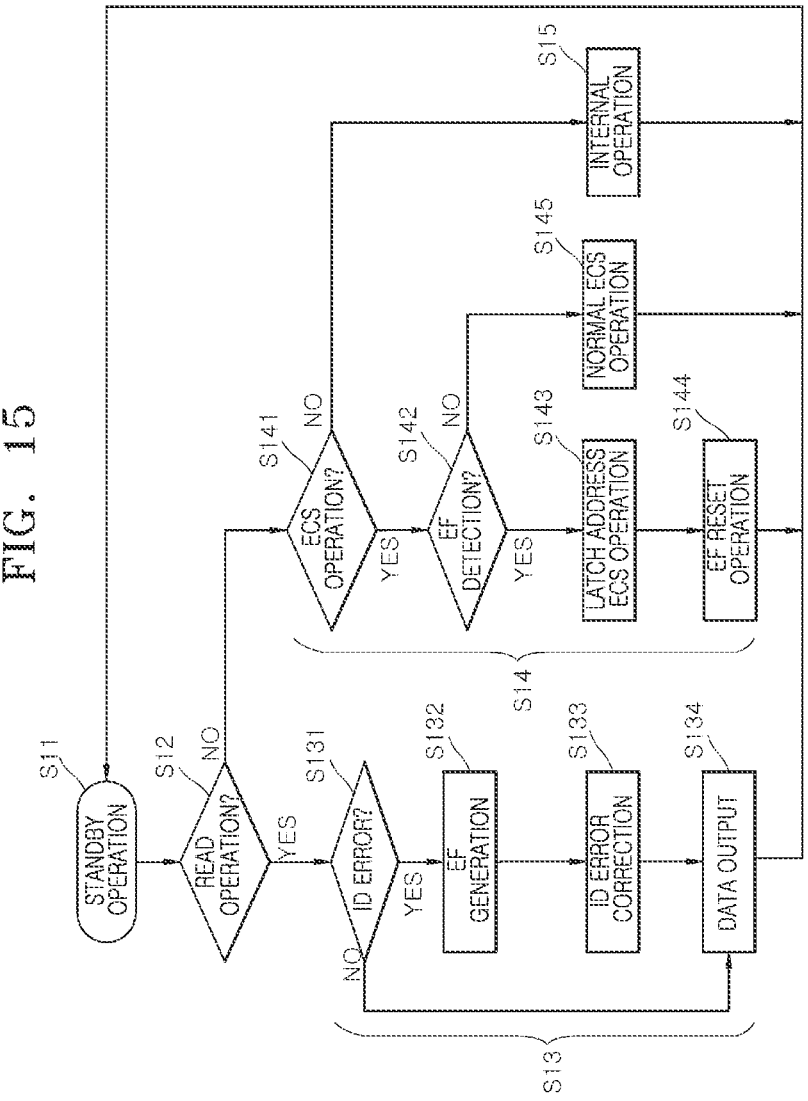
FIG. 15 is a flowchart for describing an ECS method of the semiconductor system according to an embodiment of the present disclosure.

FIG. 15 is a flowchart for describing an ECS method of the semiconductor system according to an embodiment of the present disclosure.

The ECS method may include a standby operation step S11, a read operation detection step S12, a read operation step S13, an ECS operation step S14, and an internal operation step S15.

The standby operation step S11 may be set as a step that is performed before a read operation and write operation of a normal operation are performed. In the standby operation step S11, in an embodiment, the semiconductor system 1 may maintain a standby state without performing an operation of inputting and outputting data in order to reduce current consumption.

The read operation detection step S12 may be set as a step of detecting that a read operation of a normal operation is performed. When the chip selection signal CS and the first group CA<1:4> of first to fourth command addresses each have a logic level combination for performing the read operation (YES) in the read operation detection step S12, the read operation step S13 may be entered. When the chip selection signal CS and the first group CA<1:4> of first to fourth command addresses each do not have the logic level combination for performing the read operation (NO) in the read operation detection step S12, the ECS operation step S14 may be entered.

The read operation step S13 may be set as a step of outputting the first to 128-th internal data ID<1:128> that have been stored in a memory cell that belongs to the plurality of memory cells (MC in FIG. 8) and that is selected by the first to M-th row addresses RAD<1:M> and the first to N-th column addresses CAD<1:N> (MC in FIG. 8) that are generated based on the second group CA<5:L> of command addresses after the start of the read operation. The read operation step S13 may be set as a step of generating the first to M-th latch row addresses (RLA<1:M> in FIG. 4) and the first to N-th latch column addresses (CLA<1:N> in FIG. 4) by latching the second group CA<5:L> of command addresses when an error occurs in the first to 128-th internal data ID<1:128> that have been output. The read operation step S13 may be set as a step of outputting the first to 128-th data DATA<1:128> by correcting the error of the first to 128-th internal data ID<1:128>.

The read operation step S13 may include internal data error detection step S131, an error flag signal generation step S132, internal data error correction step S133, and a data output step S134.

The internal data error detection step S131 may be set as a step of detecting an error of the first to 128-th internal data ID<1:128> after the start of the read operation of the normal operation. When an error occurs in the first to 128-th internal data ID<1:128> (YES) in the internal data error detection step S131, the error flag signal generation step S132 may be entered. When an error does not occur in the first to 128-th internal data ID<1:128> (NO) in the internal data error detection step S131, the data output step S134 may be entered.

In the internal data error detection step S131, the operation control circuit 210 may generate the read command RD having a logic high level for the read operation by decoding the chip selection signal CS and the first group CA<1:4> of command addresses in synchronization with the clock CLK. The memory circuit 220 may output the first to 128-th internal data ID<1:128> and the first to eighth internal parities IP<1:8> that have been stored in a memory cell that is selected by the first to M-th row addresses RAD<1:M> and the first to N-th column addresses CAD<1:N>, among the plurality of memory cells (MC in FIG. 9), when the read command RD is enabled after the start of the read operation of the normal operation. The ECS control circuit 230 may detect the error of the first to 128-th internal data ID<1:128> based on the first to 128-th internal data ID<1:128> and the first to eighth internal parities IP<1:8>.

The error flag signal generation step S132 may be set as a step of generating the error flag signal EF that is enabled when an error occurs in the first to 128-th internal data ID<1:128>.

In the error flag signal generation step S132, when an error occurs in the first to 128-th internal data ID<1:128> after the ECS control circuit 230 performs an ECC encoding operation and an ECC decoding operation based on the first to 128-th internal data ID<1:128> and the first to eighth internal parities IP<1:8>, the ECS control circuit 230 may generate the error flag signal EF having a logic high level. When an error does not occur in the first to 128-th internal data ID<1:128> after the ECS control circuit 230 performs the ECC encoding operation and the ECC decoding operation based on the first to 128-th internal data ID<1:128> and the first to eighth internal parities IP<1:8>, the ECS control circuit 230 may generate the error flag signal EF having a logic low level.

The internal data error correction step S133 may be set as a step of correcting the error of the first to 128-th internal data ID<1:128> based on the first to 128-th internal data ID<1:128> and the first to eighth internal parities IP<1:8>.

In the internal data error correction step S133, the ECS control circuit 230 may correct the error of the first to 128-th internal data ID<1:128> by performing an ECC encoding operation and an ECC decoding operation based on the first to 128-th internal data ID<1:128> and the first to eighth internal parities IP<1:8>.

The data output step S134 may be set as a step of outputting the first to 128-th internal data ID<1:128> as the first to eighteenth data DATA<1:128> when an error does not occur in the first to 128-th internal data ID<1:128> (NO) in the internal data error detection step S131. The data output step S134 may be set as a step of outputting the first to 128-th internal data ID<1:128> having an error corrected as the first to eighteenth data DATA<1:128> when the error occurs in the first to 128-th internal data ID<1:128> (YES) in the internal data error detection step S131.

In the data output step S134, the ECS control circuit 230 may perform an ECC encoding operation and an ECC decoding operation based on the first to 128-th internal data ID<1:128> and the first to eighth internal parities IP<1:8>, and may output the first to 128-th internal data ID<1:128> to the data input and output circuit 240 when an error does not occur in the first to 128-th internal data ID<1:128>. The ECS control circuit 230 may perform the ECC encoding operation and the ECC decoding operation based on the first to 128-th internal data ID<1:128> and the first to eighth internal parities IP<1:8>, and may output the first to 128-th internal data ID<1:128> having an error corrected to the data input and output circuit 240 when the error occurs in the first to 128-th internal data ID<1:128>.

When the data output step S134 is completed, the standby operation step S11 may be entered again.

The ECS operation step S14 may be set as a step of correcting an error of the first to 128-th internal data ID<1:128> that have been stored in the memory cell (MC in FIG. 8) that is selected by the first to M-th latch row addresses (RLA<1:M> in FIG. 4) and the first to N-th latch column addresses (CLA<1:N> in FIG. 4) based on the logic level of the error flag signal EF after the start of an ECS operation and storing the first to 128-th internal data ID<1:128> having the error corrected in the same memory cell (MC in FIG. 8). The ECS operation step S14 may be set as a step of storing the first to 128-th internal data ID<1:128> having an error corrected in the memory cell (MC in FIG. 8) that is selected by the first to M-th latch row addresses (RLA<1:M> in FIG. 4) and the first to N-th latch column addresses (CLA<1:N> in FIG. 4) again and then storing the first to 128-th internal data ID<1:128> that have been stored in the plurality of memory cells (MC in FIG. 8) again by correcting an error of the first to 128-th internal data ID<1:128>.

The ECS operation step S14 may include an ECS operation detection step S141, an error flag signal detection step S142, an ECS operation execution step S143, an error flag signal reset step S144, and a normal ECS operation step S145.

The ECS operation detection step S141 may be set as a step of detecting an ECS operation.

When the chip selection signal CS and the first group CA<1:4> of first to fourth command addresses each have a logic level combination for performing the ECS operation (YES) in the ECS operation detection step S141, the error flag signal detection step S142 may be entered. When the chip selection signal CS and the first group CA<1:4> of first to fourth command addresses each do not have the logic level combination for performing the ECS operation (NO) in the ECS operation detection step S141, the internal operation step S15 may be entered.

The error flag signal detection step S142 may be set as a step of detecting the logic level of the error flag signal EF. When the error flag signal EF is enabled to a logic high level (YES) in the error flag signal detection step S142, the ECS operation execution step S143 may be entered. When the error flag signal EF is disabled to a logic low level (NO) in the error flag signal detection step S142, the normal ECS operation step S145 may be entered.

The ECS operation execution step S143 may be set as a step of storing the first to 128-th internal data ID<1:128> that have been stored in the memory cell (MC in FIG. 8) that is selected by the first to M-th latch row addresses (RLA<1:M> in FIG. 4) and the first to N-th latch column addresses (CLA<1:N> in FIG. 4) in the same memory cell (MC in FIG. 8) again, by correcting an error of the first to 128-th internal data ID<1:128> when the error flag signal EF is enabled to a logic high level (YES).

In the ECS operation execution step S143, the operation control circuit 210 may generate the read command RD having a logic high level for a read operation by decoding the chip selection signal CS and the first group CA<1:4> of command addresses in synchronization with the clock CLK. The operation control circuit 210 may generate the first to M-th row addresses RAD<1:M> and the first to N-th column addresses CAD<1:N>, based on the first to M-th latch row addresses (RLA<1:M> in FIG. 4) and the first to N-th latch column addresses (CLA<1:N> in FIG. 4) that have been generated by latching the second group CA<5:L> of command addresses, when the error flag signal EF is enabled to a logic high level after the start of the read operation of the ECS operation. In the ECS operation execution step S143, the memory circuit 220 may output the first to 128-th internal data ID<1:128> and the first to eighth internal parities IP<1:8> that have been stored in a memory cell that is selected by the first to M-th row addresses RAD<1:M> and the first to N-th column addresses CAD<1:N>, among the plurality of memory cells (MC in FIG. 9), when the read command RD is enabled after the start of the read operation of the ECS operation. In the ECS operation execution step S143, the ECS control circuit 230 may correct an error of the first to 128-th internal data ID<1:128> based on the first to 128-th internal data ID<1:128> and the first to eighth internal parities IP<1:8>. The ECS control circuit 230 may output the first to 128-th internal data ID<1:128> having the error corrected to the memory circuit 220. In the ECS operation execution step S143, the operation control circuit 210 may generate the write command WT having a logic high level for a write operation by decoding the chip selection signal CS and the first group CA<1:4> of command addresses in synchronization with the clock CLK. The memory circuit 220 may store the first to 128-th internal data ID<1:128> having an error corrected in a memory cell that is selected by the first to M-th row addresses RAD<1:M> and the first to N-th column addresses CAD<1:N>, among the plurality of memory cells (MC in FIG. 9), when the write command WT is enabled after the start of the write operation of the ECS operation.

The error flag signal reset step S144 may be set as a step of disabling the error flag signal EF after storing the first to 128-th internal data ID<1:128> again by correcting the error of the first to 128-th internal data ID<1:128>.

In the error flag signal reset step S144, the error flag signal generation circuit 234 may store the first to 128-th internal data ID<1:128> again by correcting an error of the first to 128-th internal data ID<1:128>, and may then generate the error flag signal EF that is disabled to a logic low level.

When the error flag signal reset step S144 is completed, the standby operation step S11 may be entered again.

The normal ECS operation step S145 may be set as a step of storing the first to 128-th internal data ID<1:128> that have been stored in the plurality of memory cells (MC in FIG. 8) again based on the first to M-th row addresses RAD<1:M> and the first to N-th column addresses CAD<1:N> that are sequentially counted when the error flag signal EF is disabled by correcting an error of the first to 128-th internal data ID<1:128>.

In the normal ECS operation step S145, the operation control circuit 210 may generate the first to M-th row addresses RAD<1:M> and the first to N-th column addresses CAD<1:N> that are sequentially counted when the error flag signal EF is disabled to a logic low level after the start of a read operation of an ECS operation. In the normal ECS operation step S145, when the read command RD is enabled after the start of the read operation of an ECS operation, the memory circuit 220 may output the first to 128-th internal data ID<1:128> and the first to eighth internal parities IP<1:8> that have been stored in a memory cell that is selected by the first to M-th row addresses RAD<1:M> and the first to N-th column addresses CAD<1:N>, among the plurality of memory cells (MC in FIG. 9). In the normal ECS operation step S145, the ECS control circuit 230 may correct an error of the first to 128-th internal data ID<1:128> based on the first to 128-th internal data ID<1:128> and the first to eighth internal parities IP<1:8>. The ECS control circuit 230 may output the first to 128-th internal data ID<1:128> having the error corrected to the memory circuit 220. In the normal ECS operation step S145, the operation control circuit 210 may generate the write command WT having a logic high level for a write operation by decoding the chip selection signal CS, the first group CA<1:4> of command addresses in synchronization with the clock CLK. The memory circuit 220 may store the first to 128-th internal data ID<1:128> having the error corrected again in a memory cell that is selected by the first to M-th row addresses RAD<1:M> and the first to N-th column addresses CAD<1:N> that are sequentially counted, among the plurality of memory cells (MC in FIG. 9) when the write command WT is enabled after the start of the write operation of the ECS operation.

When the normal ECS operation step S145 is completed, the standby operation step S11 may be entered again.

The internal operation step S15 may be set as a step of performing a precharge operation.

In the internal operation step S15, the operation control circuit 210 may generate the precharge command PCG having a logic high level for a precharge operation by decoding the chip selection signal CS and the first group CA<1:4> of command addresses in synchronization with the clock CLK. The memory circuit 220 may perform the precharge operation when the precharge command PCG is enabled to a logic high level. The internal operation step S15 has been set as the precharge operation, but may be set as various internal operations of the semiconductor device 20.

When the internal operation step S15 is completed, the standby operation step S11 may be entered again.

In the ECS method according to the embodiment of the present disclosure, the priority of an ECS operation can be set by latching the command addresses CA<5:L> when an error occurs in the first to 128-th internal data ID<1:128> after the start of a read operation of a normal operation, preferentially performing an ECS operation on a memory cell corresponding to the command addresses CA<5:L> that have been latched after the start of an ECS operation, and then sequentially performing the ECS operation on the plurality of memory cells. In the ECS method, in an embodiment, an error of the first to 128-th internal data ID<1:128> can be rapidly corrected by latching the command addresses CA<5:L> when an error occurs in the first to 128-th internal data ID<1:128> after the start of a read operation of a normal operation, preferentially performing an ECS operation on a memory cell corresponding to the command addresses CA<5:L> that have been latched after the start of an ECS operation, and then sequentially performing the ECS operation on the plurality of memory cells.

Figure 16:
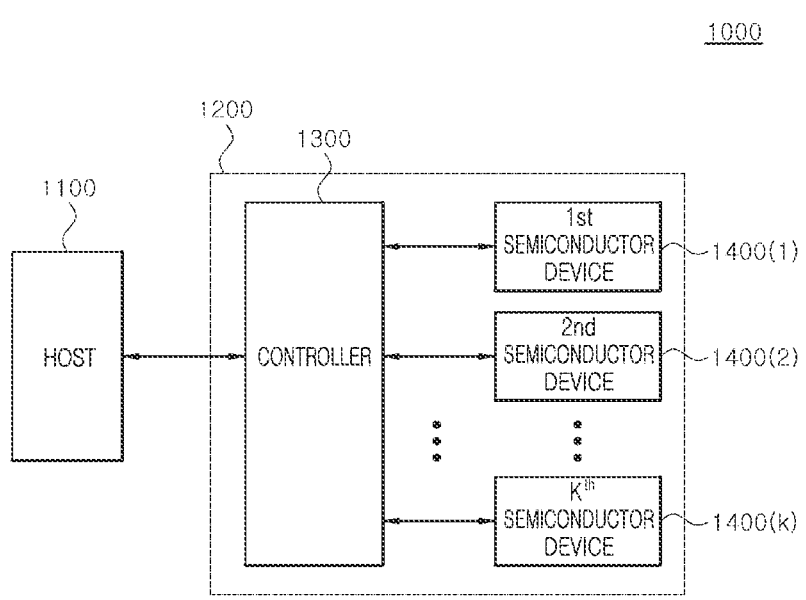
FIG. 16 is a diagram illustrating a construction according to an embodiment of an electronic system to which the semiconductor system illustrated in FIGS. 1 and 15 has been applied.

FIG. 16 is a block diagram illustrating a construction according to an embodiment of an electronic system 1000 according to an embodiment of the present disclosure. As illustrated in FIG. 16, the electronic system 1000 may include a host 1100 and a semiconductor system 1200.

The host 1100 and the semiconductor system 1200 may mutually transmit signals by using an interface protocol. The interface protocol that is used between the host 1100 and the semiconductor system 1200 may include a multi-media card (MMC), an enhanced small disk interface (ESDI), integrated drive electronics (IDE), peripheral component interconnect-express (PCI-E), advanced technology attachment (ATA), serial ATA (SATA), parallel ATA (PATA), a serial attached SCSI (SAS), and a universal serial bus (USB).

The semiconductor system 1200 may include a controller 1300 and semiconductor devices 1400(K:1). The controller 1300 may control the semiconductor devices 1400(K:1) so that the semiconductor devices 1400(K:1) perform a normal operation and an ECS operation. The semiconductor devices 1400(K:1) may each may latch the command addresses CA<5:L> when an error occurs in the first to 128-th internal data ID<1:128> after the start of a read operation of a normal operation. The semiconductor devices 1400(K:1) may each set the priority of an ECS operation by preferentially performing an ECS operation on a memory cell corresponding to the command addresses CA<5:L> that have been latched after the start of the ECS operation and then sequentially performing the ECS operation on the plurality of memory cells. In an embodiment, the semiconductor devices 1400 (K:1) can rapidly correct an error of the first to 128-th internal data ID<1:128> by preferentially performing an ECS operation on a memory cell corresponding to the command addresses CA<5:L> that have been latched after the start of the ECS operation and then sequentially performing the ECS operation on the plurality of memory cells.

In an embodiment, the controller 1300 may be implemented as the controller 10 illustrated in FIG. 1. In an embodiment, the semiconductor devices 1400(K:1) may each be implemented as the semiconductor device 20 illustrated in FIG. 1. According to an embodiment, the semiconductor devices 1400(K:1) may each be implemented as one of dynamic random access memory (DRAM), phase change random access memory (PRAM), resistive random access memory (RRAM), magnetic random access memory (MRAM), and ferroelectric random access memory (FRAM).

What is claimed is:

1. A semiconductor system comprising:
   a controller configured to output a chip selection signal and a command address including a first logic level combination for performing a read operation and configured to then output a chip selection signal and a command address including a second logic level combination different from the first logic level combination for performing an error check scrub (ECS) operation; and
   a semiconductor device comprising a plurality of memory cells and configured to receive the command address to generate an internal command address used to generate a latch row address and a latch column address by latching the internal command address when an error occurs in internal data that is output from a memory cell that is selected, from the plurality of memory cells, after a start of the read operation based on the chip selection signal and the command address, configured to determine a priority of the ECS operation for the plurality of memory cells corresponding to the latch row address and the latch column address, and configured to store the internal data in the same memory cell again that was selected after correcting the error of the internal data.

2. The semiconductor system of claim 1, wherein the semiconductor device is configured to
   store the internal data that is output from the memory cell that is selected, among the plurality of memory cells, again in the same memory cell that output the internal data after correcting the error of the internal data based on the latch row address and the latch column address after a start of the ECS operation, and
   then store the internal data that is stored in the plurality of memory cells that are sequentially selected based on the row address and the column address again in an identical memory cell by correcting an error of the internal data.

3. The semiconductor system of claim 1, wherein the priority of the ECS operation means preferentially performing an operation of storing the internal data that have been stored in the memory cell that is selected, among the plurality of memory cells, again based on the latch row address and the latch column address after correcting the error of the internal data.

4. The semiconductor system of claim 1, wherein the semiconductor device comprises:
   an operation control circuit configured to generate the latch row address and the latch column address by latching the command address for selecting the memory cell that is selected, among the plurality of memory cells, when the error occurs in the internal data that are output from the memory cell that is selected, among the plurality of memory cells that are included in a memory circuit after the start of the read operation and configured to generate the row address and the column address that are sequentially counted after generating the row address and the column address from the latch row address and the latch column address after a start of the ECS operation; and
   an ECS control circuit configured to correct the error of the internal data that is output from the memory cell that is selected by the row address and the column address, among the plurality of memory cells, after a start of the ECS operation and configured to output the internal data having the error corrected in order to store the internal data having the error corrected in the memory cell that is selected, among the plurality of memory cells, again.

5. The semiconductor system of claim 4, wherein the operation control circuit is configured to:
   generate the row address and the column address from the latch row address and the latch column address based on an error flag signal that is enabled when the error occurs in the internal data; and
   generate the row address and the column address by sequentially counting the row address and the column address when the error flag signal is disabled.

6. The semiconductor system of claim 5, wherein the operation control circuit is configured to:
   generate the row address and the column address from the latch row address and the latch column address;
   store the internal data again after correcting the error of the internal data; and
   then disable the error flag signal.

7. The semiconductor system of claim 1, wherein the operation control circuit comprises:
   an input circuit configured to generate an internal chip selection signal and the internal command address including first and second groups of internal command addresses by receiving the chip selection signal and the command address in synchronization with a clock;
   a command decoder configured to generate a read command for performing the read operation by decoding the internal chip selection signal and the first group of internal command addresses and configured to generate a write command after generating an ECS command for performing the ECS operation and the read command by decoding the internal chip selection signal and the first group of internal command addresses; and
   an address generation circuit configured to generate the row address and the column address based on the second group of internal command addresses when the ECS command is disabled, configured to generate the row address and the column address by latching the second group of internal command addresses during an interval in which an error flag signal is enabled when the ECS command is enabled, and configured to generate the row address and the column address that are sequentially counted during an interval in which the error flag signal is disabled.

8. The semiconductor system of claim 7, wherein the address generation circuit comprises:
an error address generation circuit configured to latch the second group of internal command addresses during the interval in which the error flag signal is enabled when the ECS command is enabled, configured to generate an error row address and an error column address from the second group of internal command addresses that have been latched, and configured to generate the error row address and the error column address that are sequentially counted during the interval in which the error flag signal is disabled when the ECS command is enabled; and
an address selection circuit configured to generate the row address and the column address based on the second group of internal command addresses when the ECS command is disabled and configured to generate the row address and the column address based on the error row address and the error column address when the ECS command is enabled.

9. The semiconductor system of claim 8, wherein the error address generation circuit comprises:
a counting circuit configured to generate a row counting signal and a column counting signal that are sequentially counted when the ECS command is enabled;
a latch circuit configured to generate the latch row address and the latch column address by latching the second group of internal command addresses during the interval in which the error flag signal is enabled; and
a selection transfer circuit configured to output the latch row address and the latch column address as the error row address and the error column address during then interval in which the error flag signal is enabled and configured to output the row counting signal and the column counting signal as the error row address and the error column address during the interval in which the error flag signal is disabled.

10. The semiconductor system of claim 4, wherein the ECS control circuit comprises:
a transfer data generation circuit configured to generate transfer data by buffering the internal data that is output from the memory cell that is selected, among the plurality of memory cells;
an error correction circuit configured to detect an error of the transfer data when a read delay signal is enabled, configured to generate the internal data by correcting the error of the transfer data, and configured to output the internal data to the memory cell that is selected, among the plurality of memory cells; and
an error flag signal generation circuit configured to generate an error flag signal that is enabled based on an error correction signal that is generated by detecting the error of the transfer data and configured to generate the error flag signal that is disabled after the internal data is stored again after correcting the error of the internal data.

11. The semiconductor system of claim 10, wherein the error correction circuit comprises:
an operation parity generation circuit configured to generate an operation parity comprising information including the error of the transfer data when the read delay signal is enabled;
a syndrome generation circuit configured to generate a syndrome by comparing the operation parity and an internal parity that is output from an error cell that is included in the memory circuit;
an error correction signal generation circuit configured to generate the error correction signal by decoding the syndrome; and
an error processing circuit configured to output the transfer data as the internal data after correcting the error of the transfer data based on the error correction signal.

12. A semiconductor device comprising:
an operation control circuit configured to receive a command address to generate an internal command address used to generate a latch row address and a latch column address by latching the command address for selecting a memory cell that is included in a memory circuit when an error flag signal is enabled after a start of a read operation and configured to generate a row address and a column address from the latch row address and the latch column address by detecting a logic level of the error flag signal after a start of an error check scrub (ECS) operation or configured to generate the row address and the column address that are sequentially counted; and
an ECS control circuit configured to correct an error included in internal data that is output from the memory cell that is selected by the row address and the column address after the start of the ECS operation and configured to output the internal data having the error corrected before storing the internal data in the memory cell again.

13. The semiconductor device of claim 12, wherein the operation control circuit is configured to:
generate the row address and the column address from the latch row address and the latch column address when the error flag signal is enabled; and
generate the row address and the column address by sequentially counting the row address and the column address when the error flag signal is disabled.

14. The semiconductor device of claim 12, wherein the operation control circuit is configured to:
generate the row address and the column address from the latch row address and the latch column address;
store the internal data again after correcting the error of the internal data; and
disable the error flag signal.

15. The semiconductor device of claim 12, wherein the operation control circuit comprises:
an input circuit configured to generate an internal chip selection signal and the internal command address including first and second groups of internal command addresses by receiving a chip selection signal and the command address in synchronization with a clock;
a command decoder configured to generate a read command for performing the read operation by decoding the internal chip selection signal and the first group of internal command addresses and configured to generate a write command after generating an ECS command for performing the ECS operation and the read command by decoding the internal chip selection signal and the first group of internal command addresses; and
an address generation circuit configured to generate the row address and the column address based on the second group of internal command addresses when the ECS command is disabled, configured to generate the row address and the column address by latching the second group of internal command addresses during an interval in which an error flag signal is enabled when the ECS command is enabled, and configured to generate the row address and the column address that are sequentially counted during an interval in which the error flag signal is disabled.

16. The semiconductor device of claim 15, wherein the address generation circuit comprises:
an error address generation circuit configured to latch the second group of internal command addresses during the interval in which the error flag signal is enabled when the ECS command is enabled, configured to generate an error row address and an error column address from the second group of internal command addresses that have been latched, and configured to generate the error row address and the error column address that are sequentially counted during the interval in which the error flag signal is disabled when the ECS command is enabled; and
an address selection circuit configured to generate the row address and the column address based on the second group of internal command addresses when the ECS command is disabled and configured to generate the row address and the column address based on the error row address and the error column address when the ECS command is enabled.

17. The semiconductor device of claim 16, wherein the error address generation circuit comprises:
a counting circuit configured to generate a row counting signal and a column counting signal that are sequentially counted when the ECS command is enabled;
a latch circuit configured to generate the latch row address and the latch column address by latching the second group of internal command addresses during the interval in which the error flag signal is enabled; and
a selection transfer circuit configured to output the latch row address and the latch column address as the error row address and the error column address during then interval in which the error flag signal is enabled and configured to output the row counting signal and the column counting signal as the error row address and the error column address during the interval in which the error flag signal is disabled.

18. The semiconductor device of claim 12, wherein the ECS control circuit comprises:
a transfer data generation circuit configured to generate transfer data by buffering the internal data that is output from the memory cell;
an error correction circuit configured to detect an error of the transfer data when a read delay signal is enabled, configured to generate the internal data by correcting the error of the transfer data, and configured to output the internal data to the memory cell that is selected, among the plurality of memory cells; and
an error flag signal generation circuit configured to generate the error flag signal that is enabled based on an error correction signal that is generated by detecting the error of the transfer data and configured to generate the error flag signal that is disabled after the internal data is stored again after correcting the error of the internal data.

19. The semiconductor device of claim 18, wherein the error correction circuit comprises:
an operation parity generation circuit configured to generate an operation parity comprising information including the error of the transfer data when the read delay signal is enabled;
a syndrome generation circuit configured to generate a syndrome by comparing the operation parity and an internal parity that is output from an error cell that is included in the memory circuit;
an error correction signal generation circuit configured to generate the error correction signal by decoding the syndrome; and
an error processing circuit configured to output the transfer data as the internal data after correcting the error of the transfer data based on the error correction signal.

20. An error check scrub (ECS) method comprising:
a read operation step of generating a latch row address and a latch column address by latching an internal command address, generated from a command address, when an error occurs in internal data that has been stored in a memory cell that is selected by a row address and a column address that are generated based on the command address, among a plurality of memory cells, after a start of a read operation and outputting the internal data as data after correcting the error of the internal data; and
an ECS operation step of storing the internal data that has been stored in the memory cell that is selected again based on the latch row address and the latch column address after correcting the error of the internal data based on a logic level of the error flag signal after a start of an ECS operation and then storing the internal data that has been stored in the plurality of memory cells again after correcting an error of the internal data.

21. The ECS method of claim 20, wherein the error flag signal is a signal that is enabled when the error occurs in the internal data and that is disabled after the internal data are stored again after correcting the error of the internal data.

22. The ECS method of claim 20, wherein the read operation step comprises:
internal data error detection step of detecting the error of the internal data;
an error flag signal generation step of generating an error flag signal that is enabled when the error occurs in the internal data;
internal data error correction step of correcting the error of the internal data based on the internal data and an internal parity; and
a data output step of outputting the internal data as data when an error does not occur in the internal data in the internal data error detection step and outputting the internal data having the error corrected as the data when the error occurs in the internal data in the internal data error detection step.

23. The ECS method of claim 20, wherein the ECS operation step comprises:
an ECS operation detection step of detecting the ECS operation;
an error flag signal detection step of detecting a logic level of the error flag signal after the start of the ECS operation;
an ECS operation execution step of storing the internal data that have been stored in the memory cell that is selected again based on the latch row address and the latch column address when the error flag signal is enabled by correcting the error of the internal data;
an error flag signal reset step of disabling the error flag signal after storing the internal data again by correcting the error of the internal data; and
a normal ECS operation step of storing the internal data that have been stored in the plurality of memory cells again by correcting the error of the internal data based on the row address and the column address that are sequentially counted when the error flag signal is disabled.

* * * * *